April 29, 1952  F. J. SCUDDER ET AL  2,594,505
CALLING LINE IDENTIFICATION AND REGISTERING SYSTEM
Filed Dec. 9, 1949  26 Sheets-Sheet 1

FIG. I

INVENTORS F. J. SCUDDER
E. VROOM
BY
P. C. Smith
ATTORNEY

INVENTORS F. J. SCUDDER
E. VROOM
BY
P. C. Smith
ATTORNEY

INVENTORS F. J. SCUDDER
E. VROOM
BY P. C. Smith
ATTORNEY

INVENTORS F. J. SCUDDER
E. VROOM
BY
P. C. Smith
ATTORNEY

April 29, 1952 F. J. SCUDDER ET AL 2,594,505
CALLING LINE IDENTIFICATION AND REGISTERING SYSTEM
Filed Dec. 9, 1949 26 Sheets-Sheet 10

INVENTORS F. J. SCUDDER
E. VROOM
BY
ATTORNEY

April 29, 1952     F. J. SCUDDER ET AL     2,594,505
CALLING LINE IDENTIFICATION AND REGISTERING SYSTEM
Filed Dec. 9, 1949     26 Sheets-Sheet 13

INVENTORS F. J. SCUDDER
E. VROOM
BY
ATTORNEY

INVENTORS F. J. SCUDDER
E. VROOM
BY
ATTORNEY

INVENTORS F. J. SCUDDER
E. VROOM
BY
P. C. Smith
ATTORNEY

April 29, 1952 F. J. SCUDDER ET AL 2,594,505
CALLING LINE IDENTIFICATION AND REGISTERING SYSTEM
Filed Dec. 9, 1949 26 Sheets-Sheet 19

INVENTORS F. J. SCUDDER
E. VROOM
BY
ATTORNEY

INVENTORS F. J. SCUDDER
E. VROOM
BY
ATTORNEY

April 29, 1952  F. J. SCUDDER ET AL  2,594,505
CALLING LINE IDENTIFICATION AND REGISTERING SYSTEM
Filed Dec. 9, 1949  26 Sheets-Sheet 22

FIG. 22

INVENTORS F. J. SCUDDER
E. VROOM
BY
ATTORNEY

April 29, 1952  F. J. SCUDDER ET AL  2,594,505
CALLING LINE IDENTIFICATION AND REGISTERING SYSTEM
Filed Dec. 9, 1949  26 Sheets-Sheet 23

INVENTORS F. J. SCUDDER
E. VROOM
BY
ATTORNEY

INVENTORS F. J. SCUDDER
E. VROOM

April 29, 1952　　F. J. SCUDDER ET AL　　2,594,505
CALLING LINE IDENTIFICATION AND REGISTERING SYSTEM
Filed Dec. 9, 1949　　26 Sheets-Sheet 25

FIG. 25

| FIG. 1 SENDER LINE IDENT RELAYS | FIG. 2 AUX MARKER CONN. | FIG. 3 MARKER LINE IDENT REG. | FIG. 4 TRANSLATOR CONN. | FIG. 5 LINE TERM. CONN. | FIG. 6 TRANSLATOR | FIG. 7 MARKER TRANSLATOR CONN. | FIG. 8 DIRECTORY NO. AND CLASS OF SERVICE REG. | FIG. 9 CLASS AND ROUTE RELAYS |
| FIG. 10 SENDER AUX DIAL REG | | FIG. 11 MARKER SENDER CONN. | FIG. 12 MARKER DISPLAY CONN. | FIG. 13 TRUNK REG. CONN. SW. | FIG. 14 TRUNK REG. RELAYS | | FIG. 15 POS. REG CONN. SW. | FIG. 16 POS. REG. RELAYS |
| | | | | | | | | FIG. 17 POS. CALLING NO. DISPLAY |
| | | | FIG 18. MARKER (PERF.) CONNECTOR CCT. | FIG. 19 | FIG. 20 PERFORATOR | | | |
| | | | FIG. 21 | FIG. 22 | FIG. 23 DIST. JUNCT. IDENT. RELAYS | FIG. 24 DISTRICT FRAME REG. RELAYS | | |

INVENTORS F. J. SCUDDER
E. VROOM
BY P. C. Smith
ATTORNEY

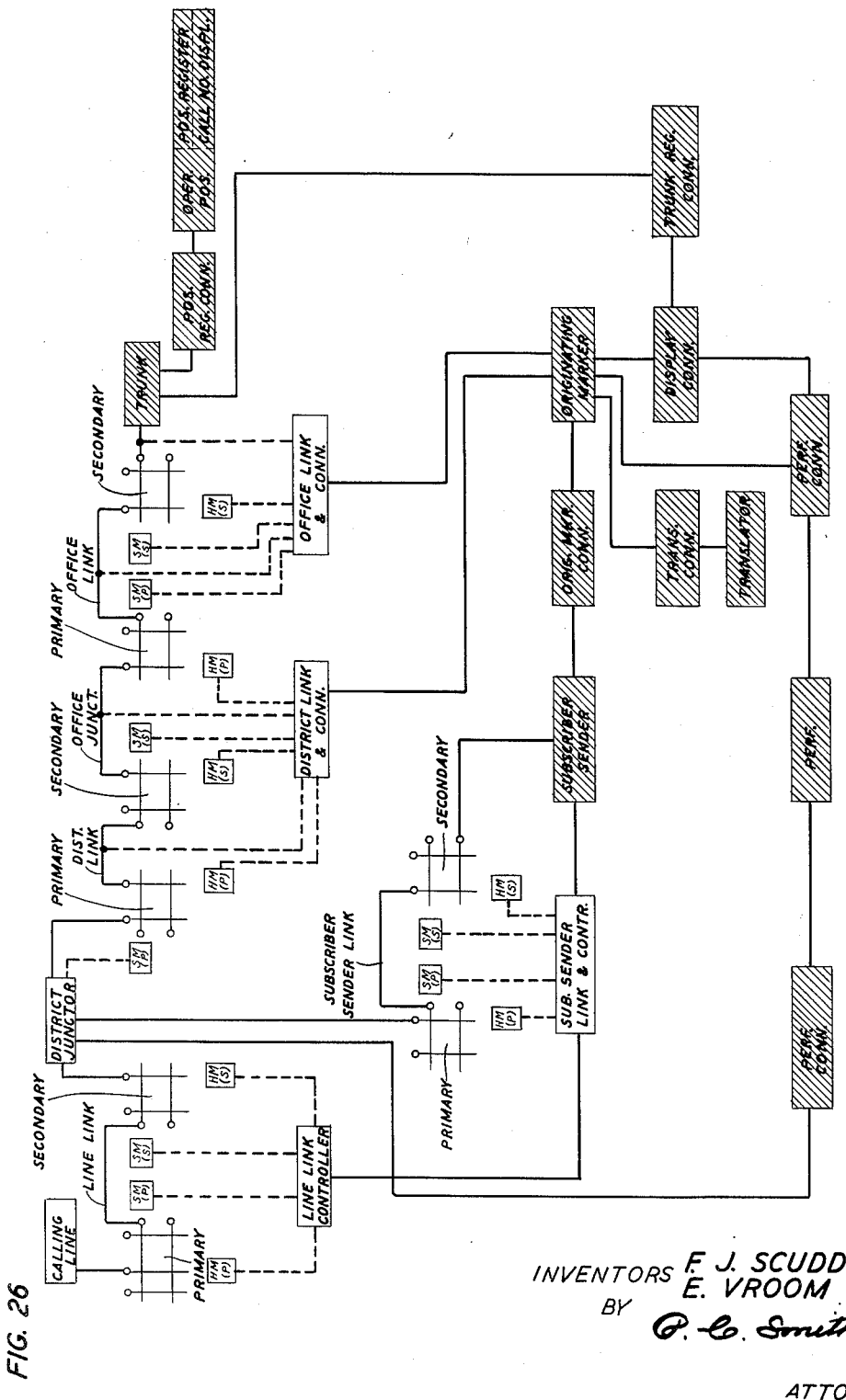

Patented Apr. 29, 1952

2,594,505

UNITED STATES PATENT OFFICE 2,594,505

CALLING LINE IDENTIFICATION AND REGISTERING SYSTEM

Frederick J. Scudder, Manhasset, and Edward Vroom, Ossining, N. Y., assignors to Bell Telephone Laboratories, Incorporated, New York, N. Y., a corporation of New York Application December 9, 1949, Serial No. 132,112

7 Claims. (Cl. 179—7)

This invention relates to automatic telephone systems and more particularly to such system wherein calling line identification is provided and utilized in a novel manner for billing purposes.

In order properly to charge a calling subscriber for a call which is extended either to a called destination automatically over a suitable trunk or by means of an operator trunk, it is necessary for the calling subscriber's directory number to be registered or recorded in some manner.

It is the main purpose of the present invention to provide circuit means for permitting such a record in either the automatic connection or the operator connection situation without requiring the calling subscriber to verbally, or by other overt act, announce or indicate such identification. Such means may reside, as herein disclosed by way of an example, in marker control of the automatic recording of an initial entry on a recording medium or marker control of the visual displaying of initial entry information in view of an operator, depending upon whether the call is to be extended automatically or by an operator.

Upon the extension of an automatic connection it is necessary for a record, such as on a perforated tape, to be made automatically of such items of information as calling subscriber's directory number, time, called number, etc. in order to charge such subscriber properly for the call. The present invention provides means for automatically comparing the class of service of the calling subscriber with the called destination and, if these are consistent, automatically extending the desired connection and effecting the record.

Upon the extension of a connection by way of an operator it is necessary for such an operator to know the directory number of the calling subscriber in order to have complete information upon which to base a proper charge. The present invention provides means for automatically comparing the class of service and the called destination and, if these are inconsistent, automatically calling in an operator to handle the extension of the call, cancelling the taking of an automatic record and effecting at the operator's position a visual display of the calling subscriber's directory number.

It is a purpose of the present invention therefore to compare, on each call, the class of service of the calling subscriber with the latter's desired called destination and, depending upon whether or not these two factors are consistent, controlling either, but not both, of an automatic recording means or an operator's visual display means in accordance with the calling subscriber's directory number.

The above-outlined invention will be understood from the subsequent detailed description of a preferred embodiment thereof disclosed in the accompanying drawings which may be described generally as follows:

Fig. 26 is a block diagram of a system in which the present invention may be used;

Figure 3:
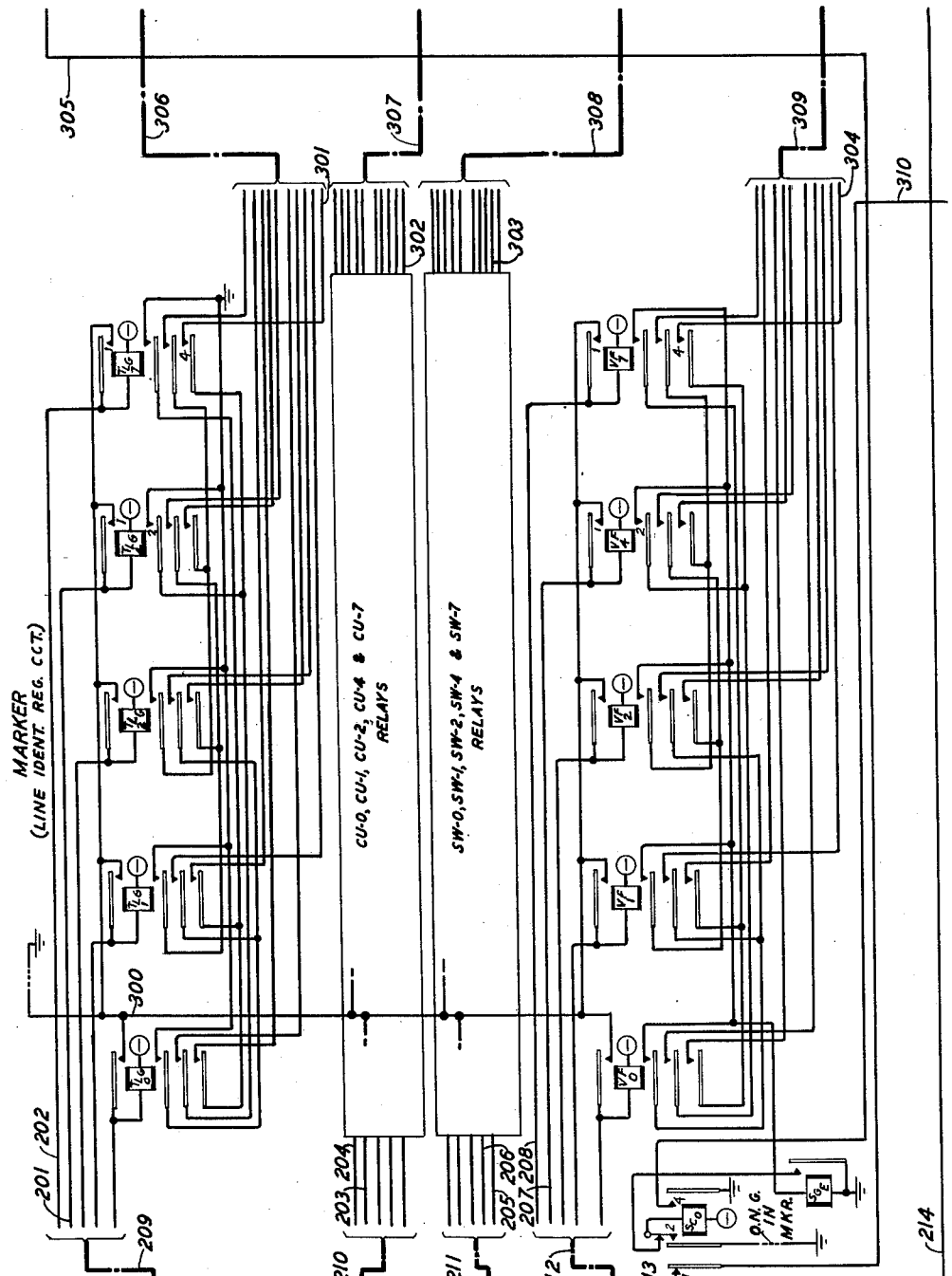
Figure 4:
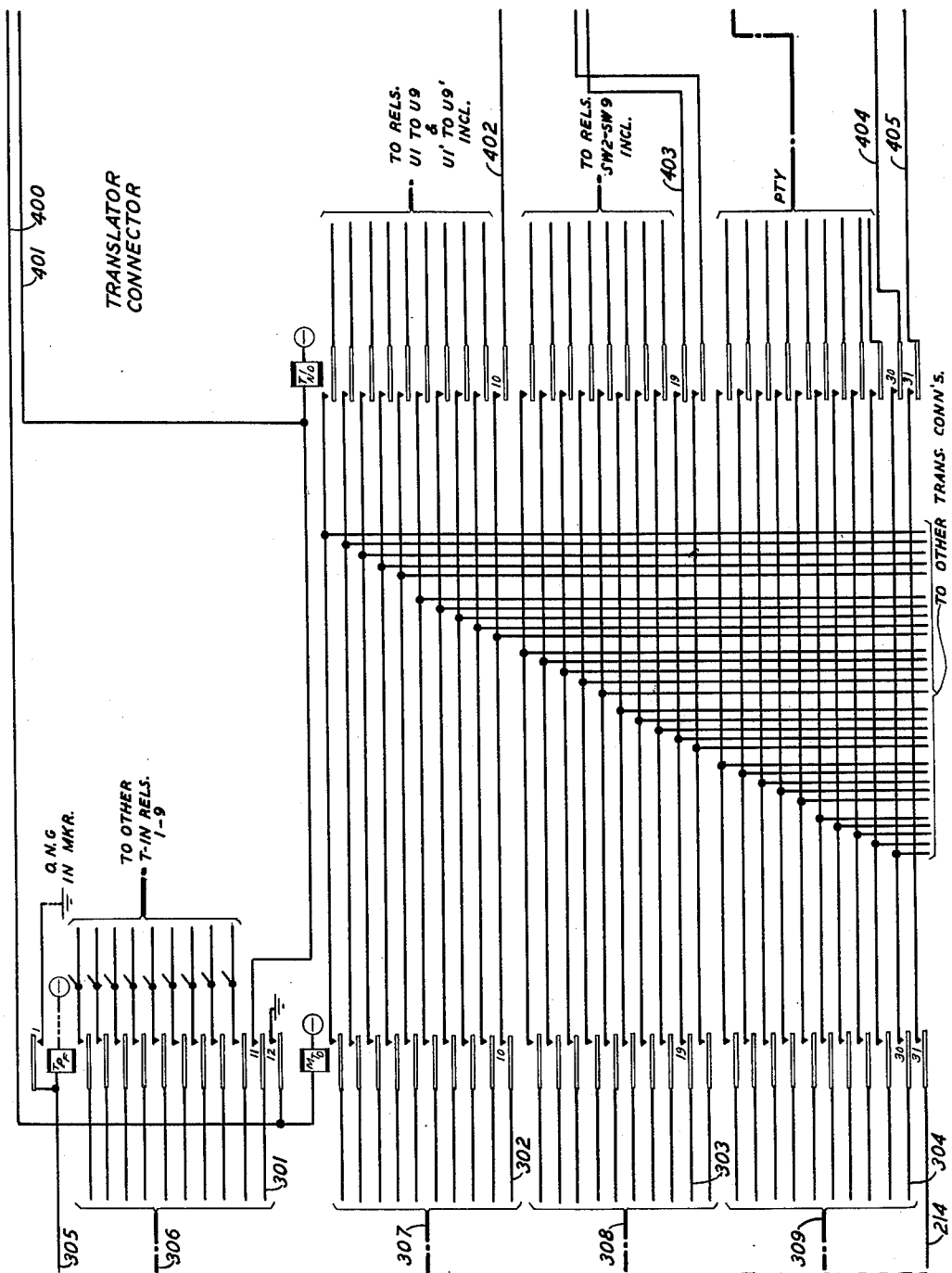
Figure 5:
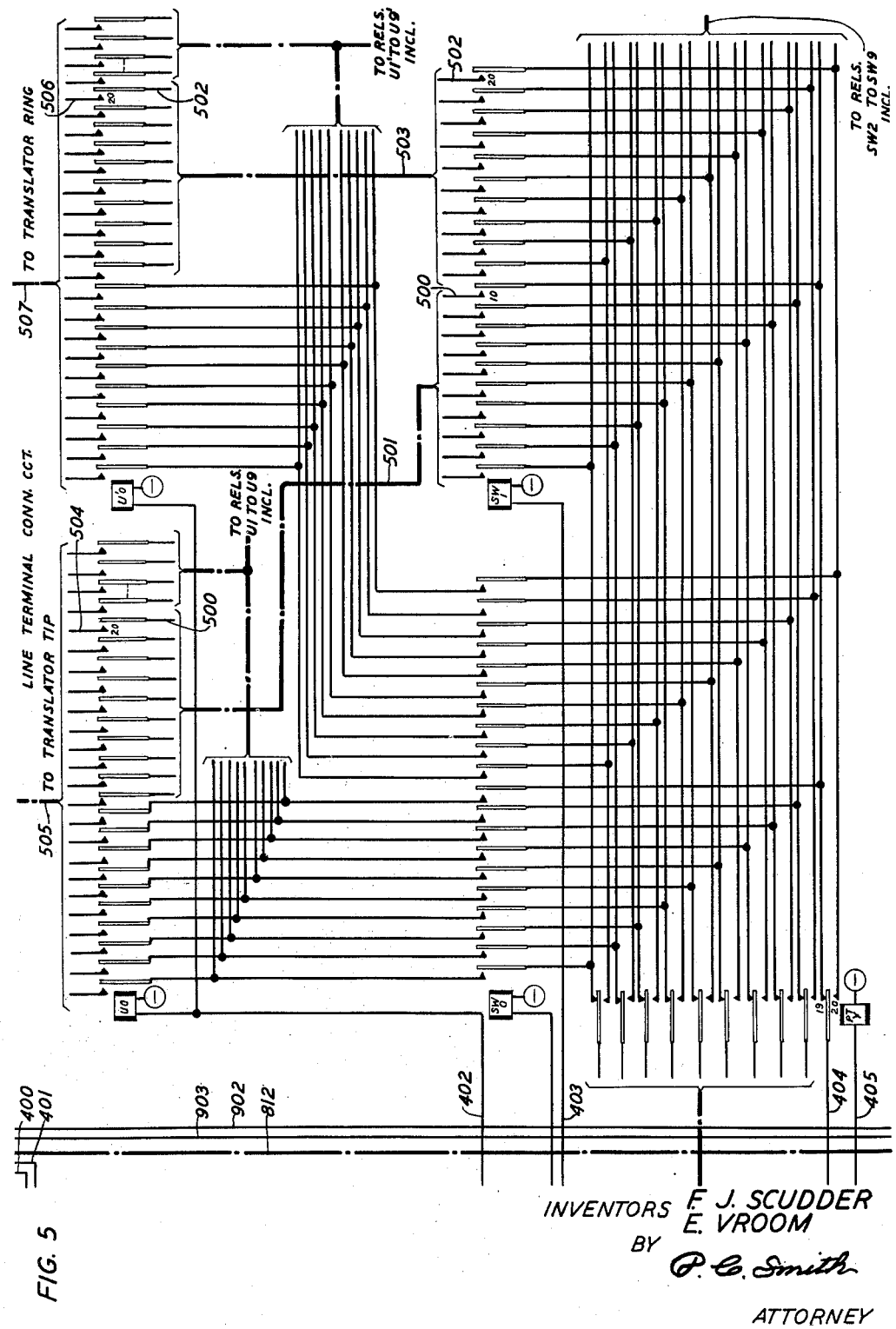
Figure 6:
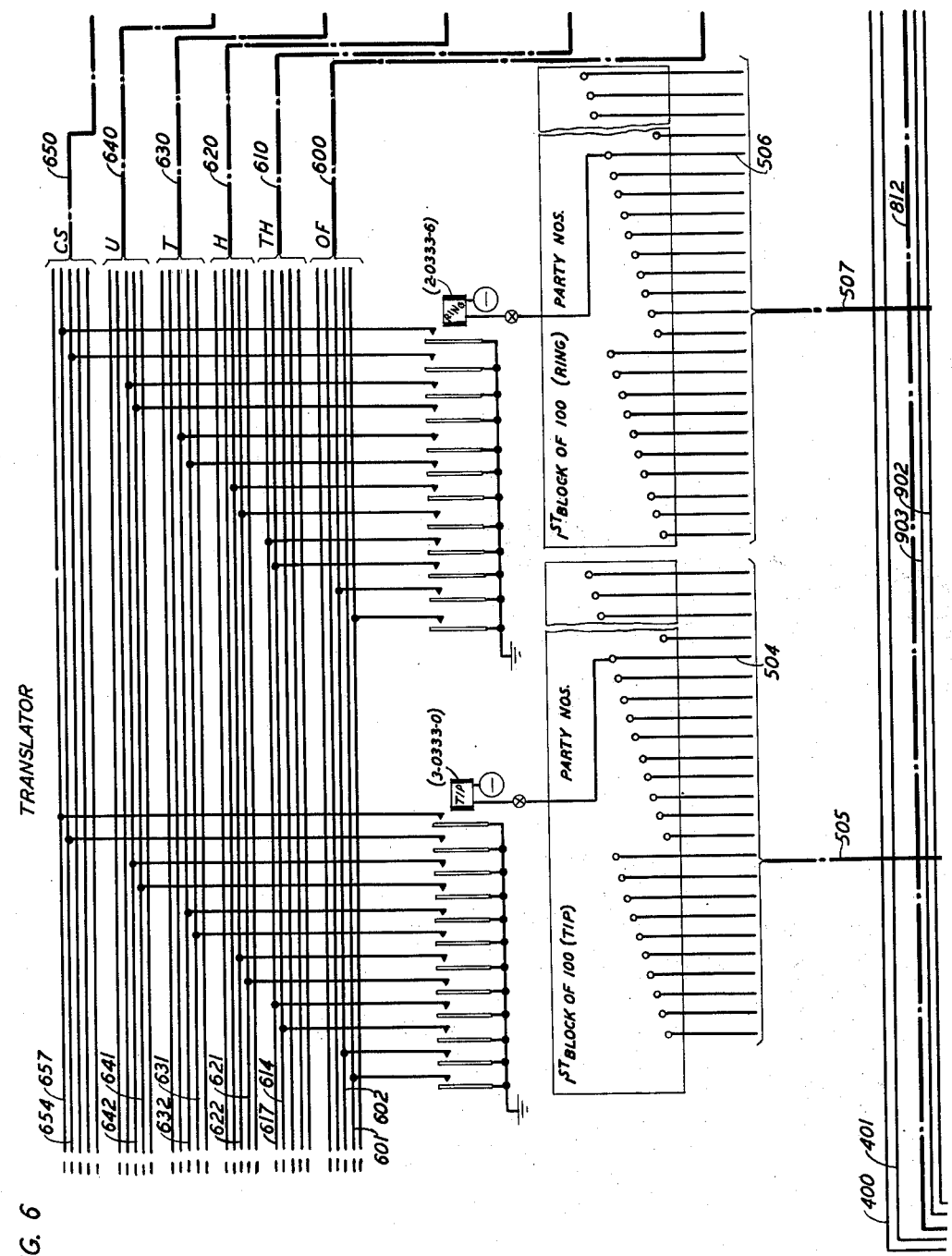
Figure 7:
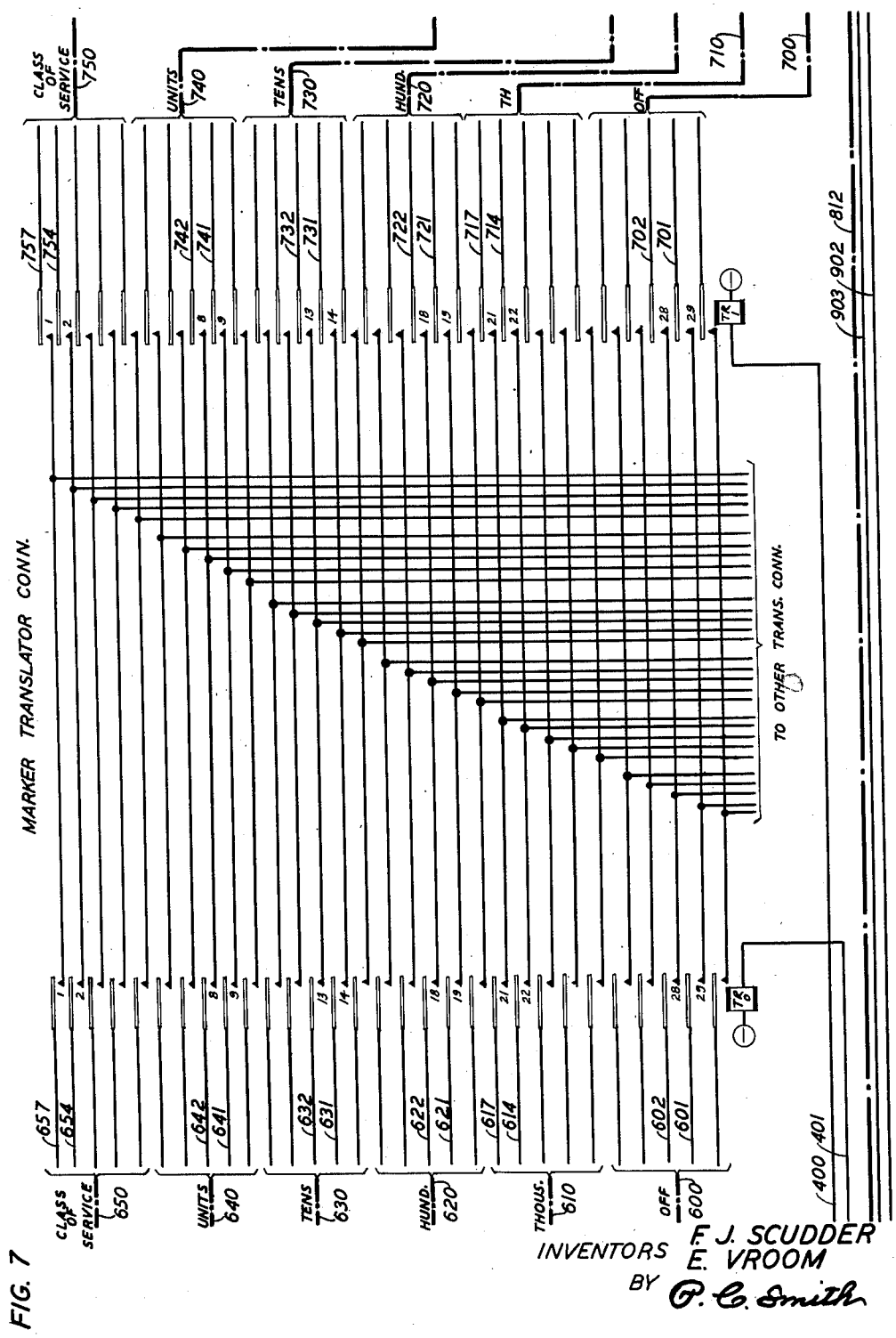
Figure 8:
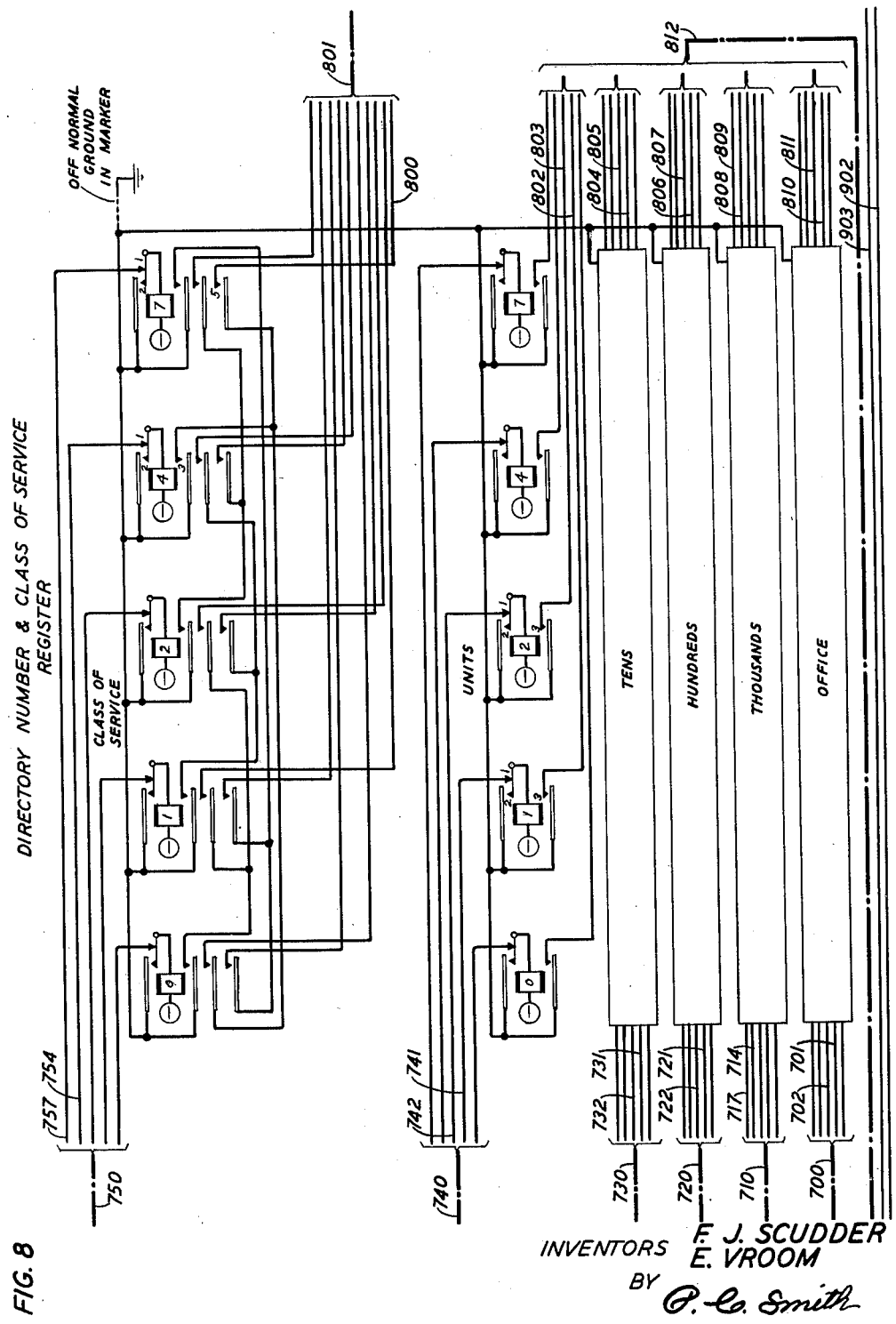
Figure 9:
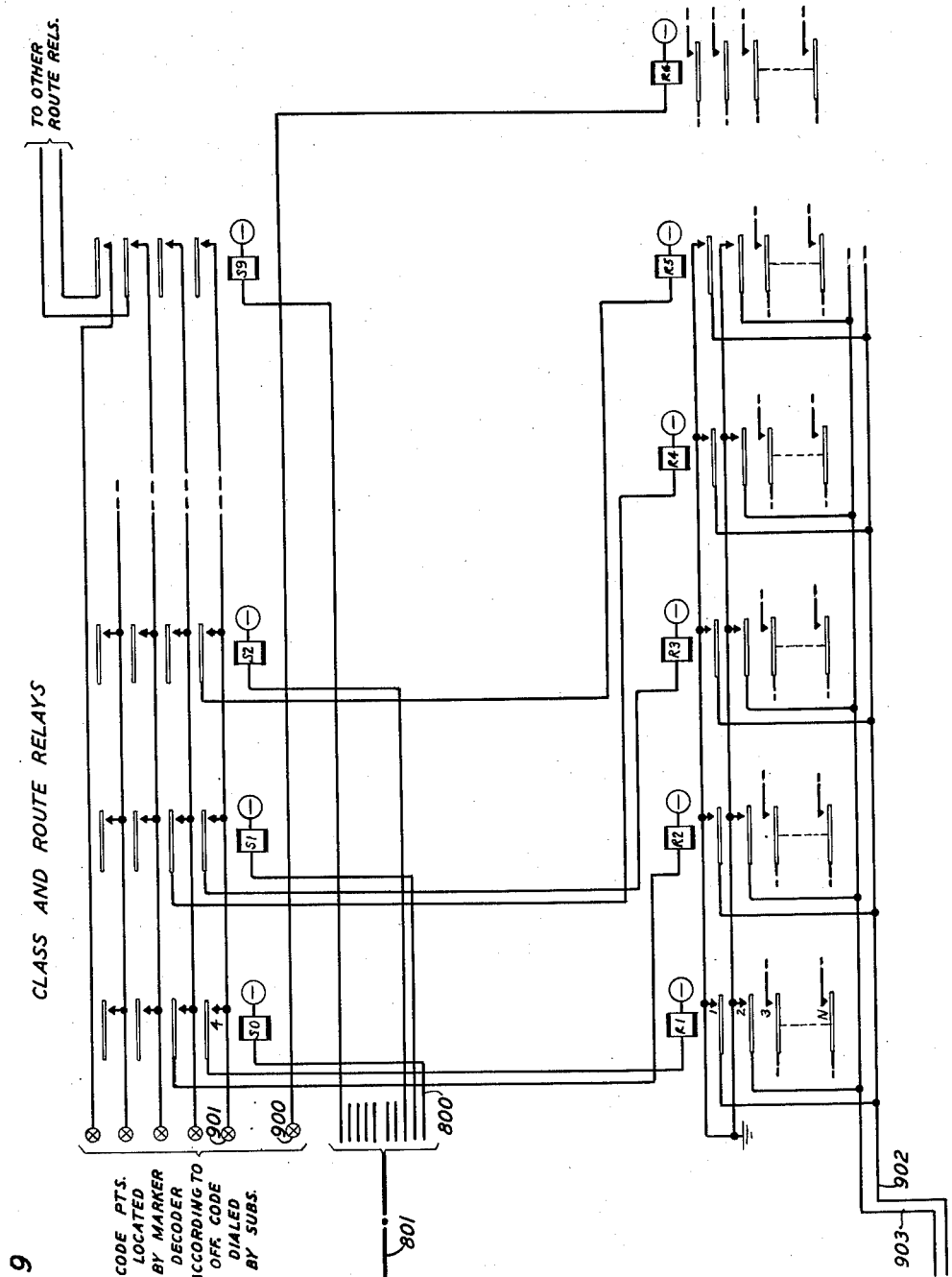
Figure 10:
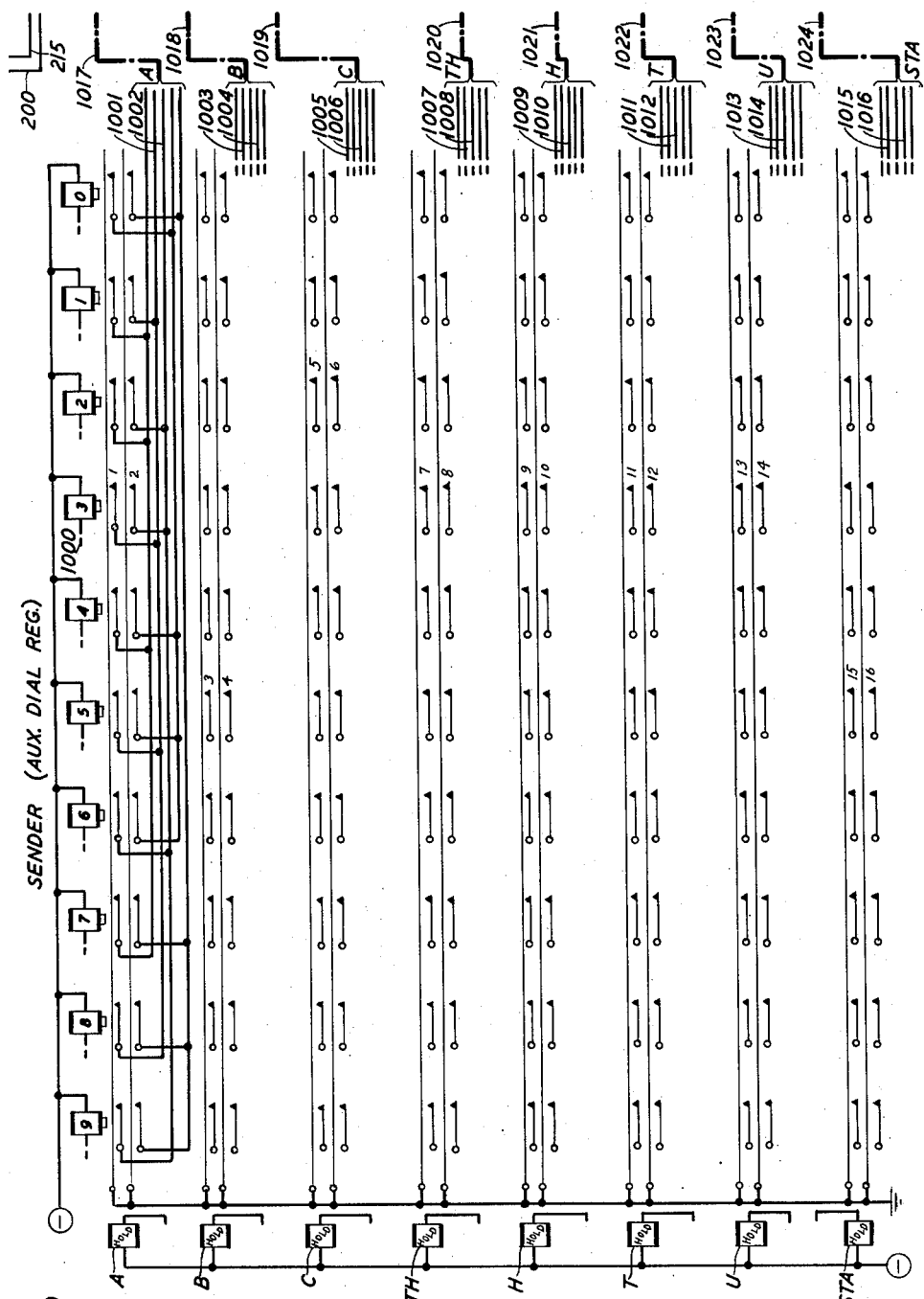
Figure 11:
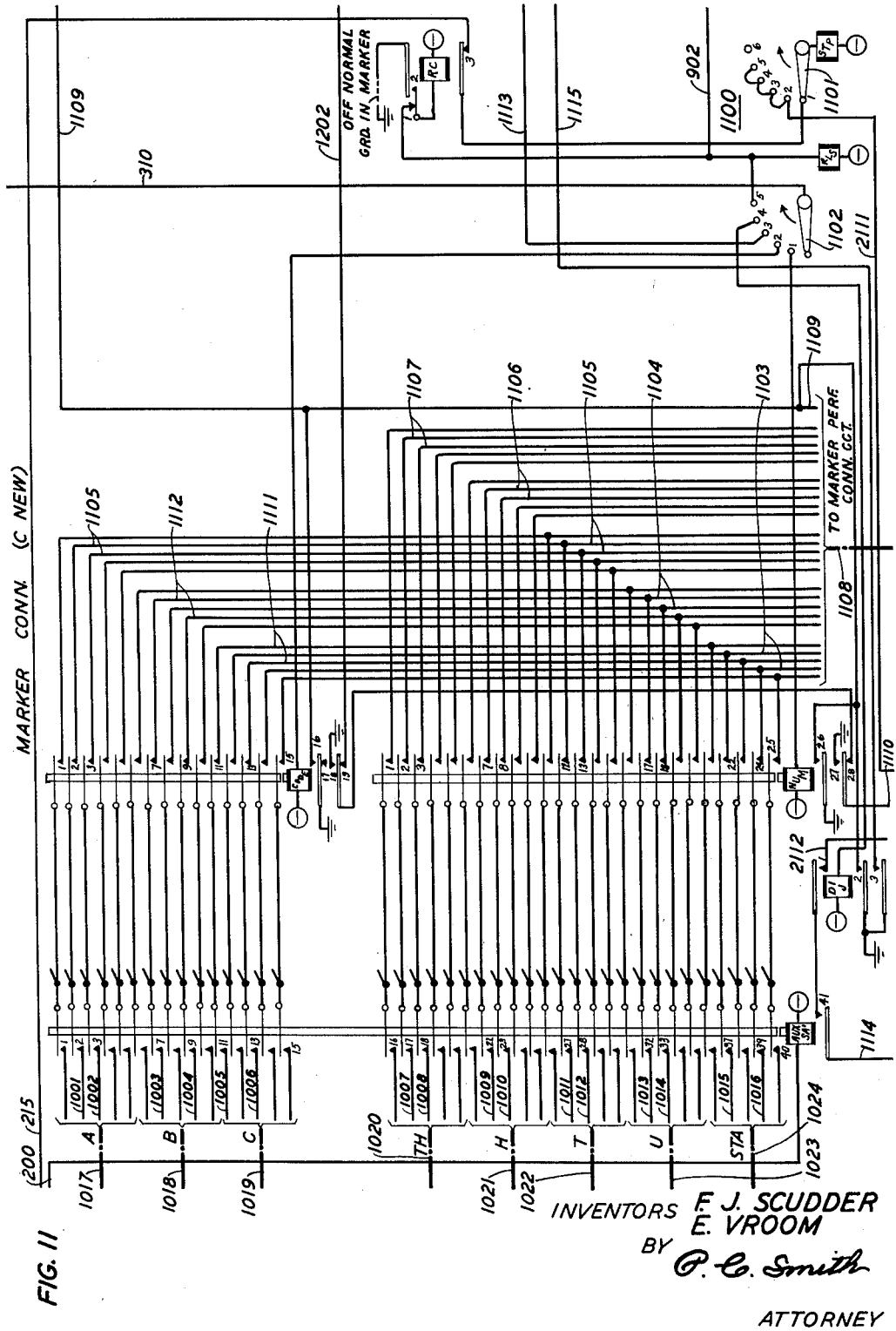
Figure 12:
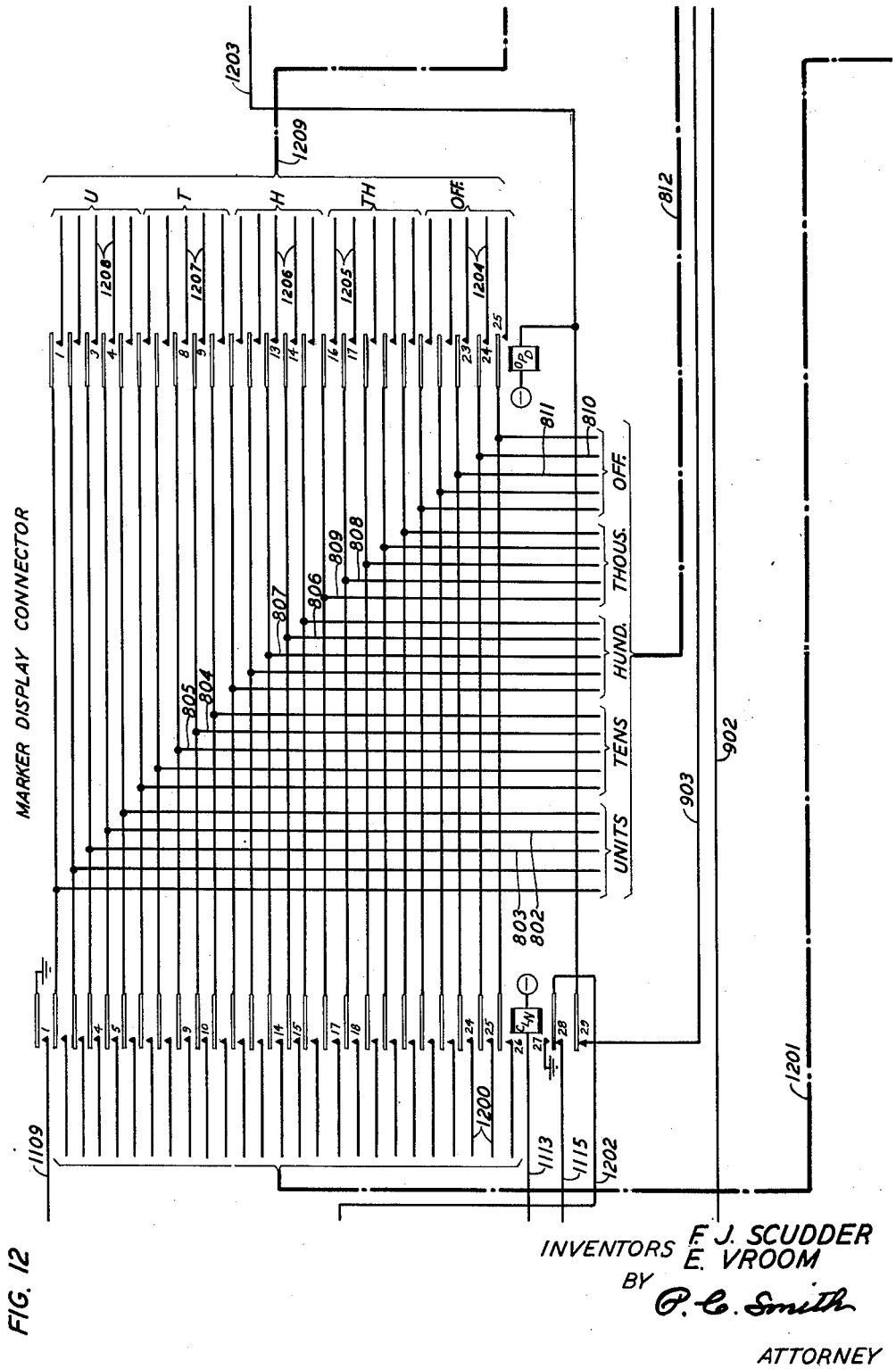
Figure 13:
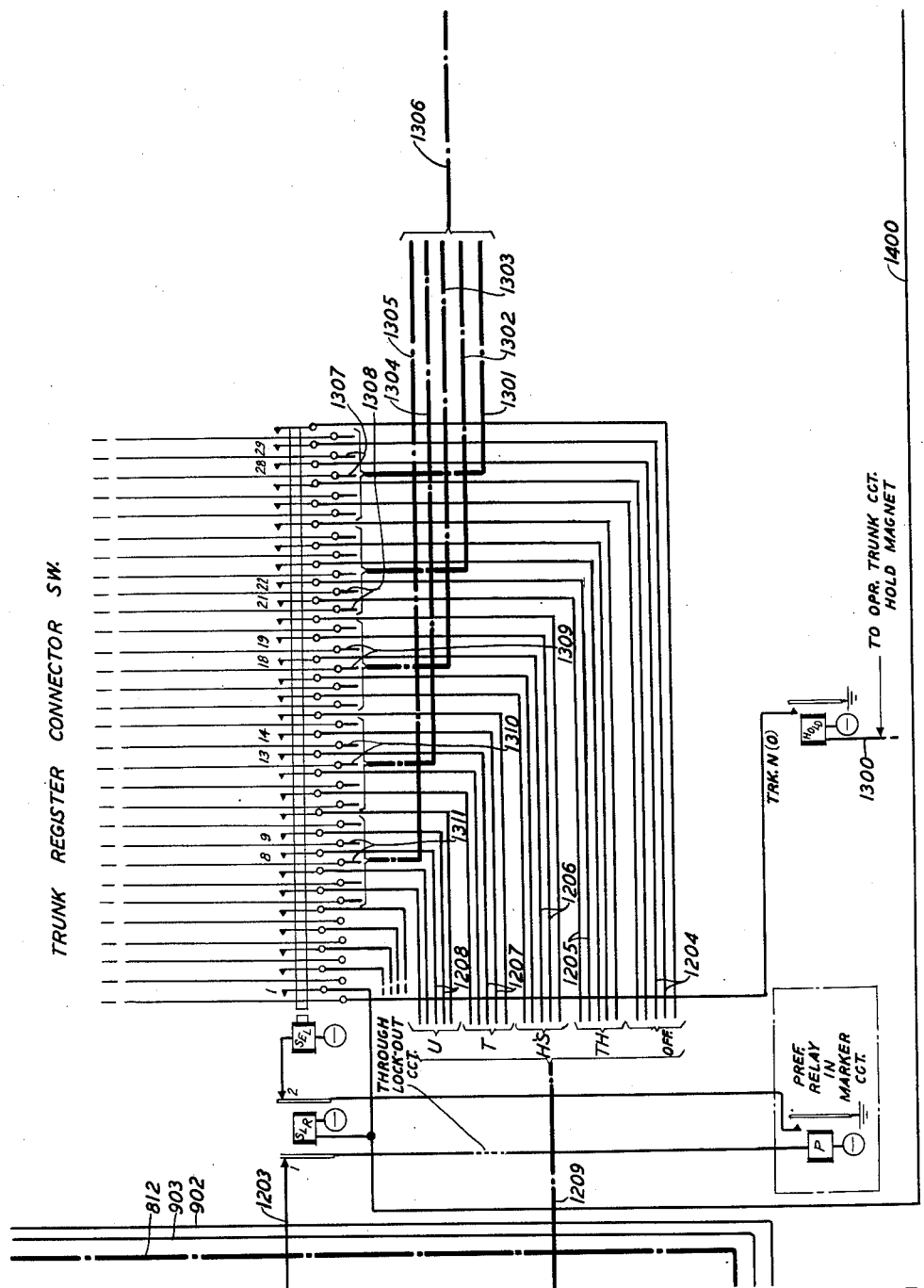
Figure 14:
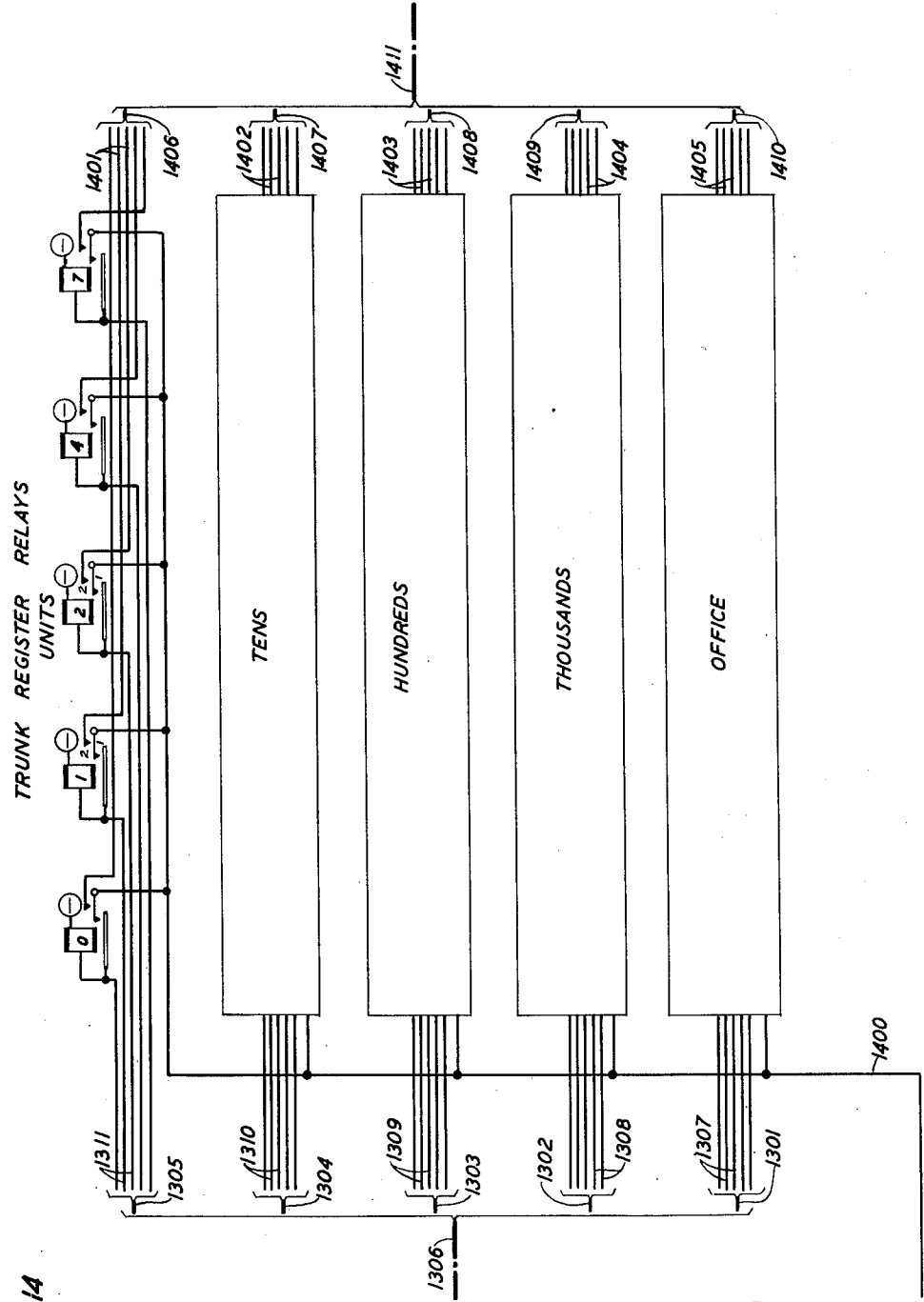
Figure 15:
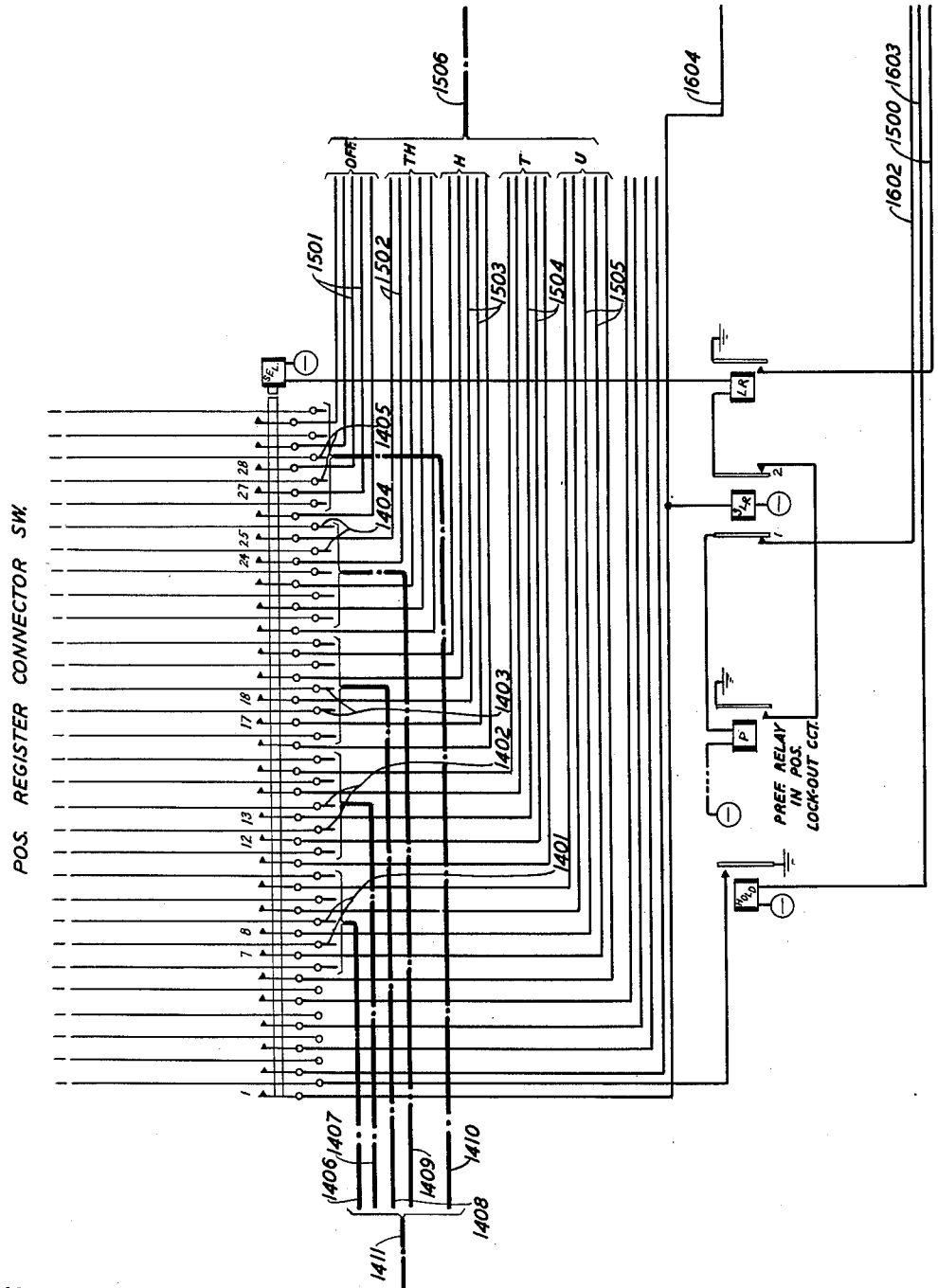
Figure 16:
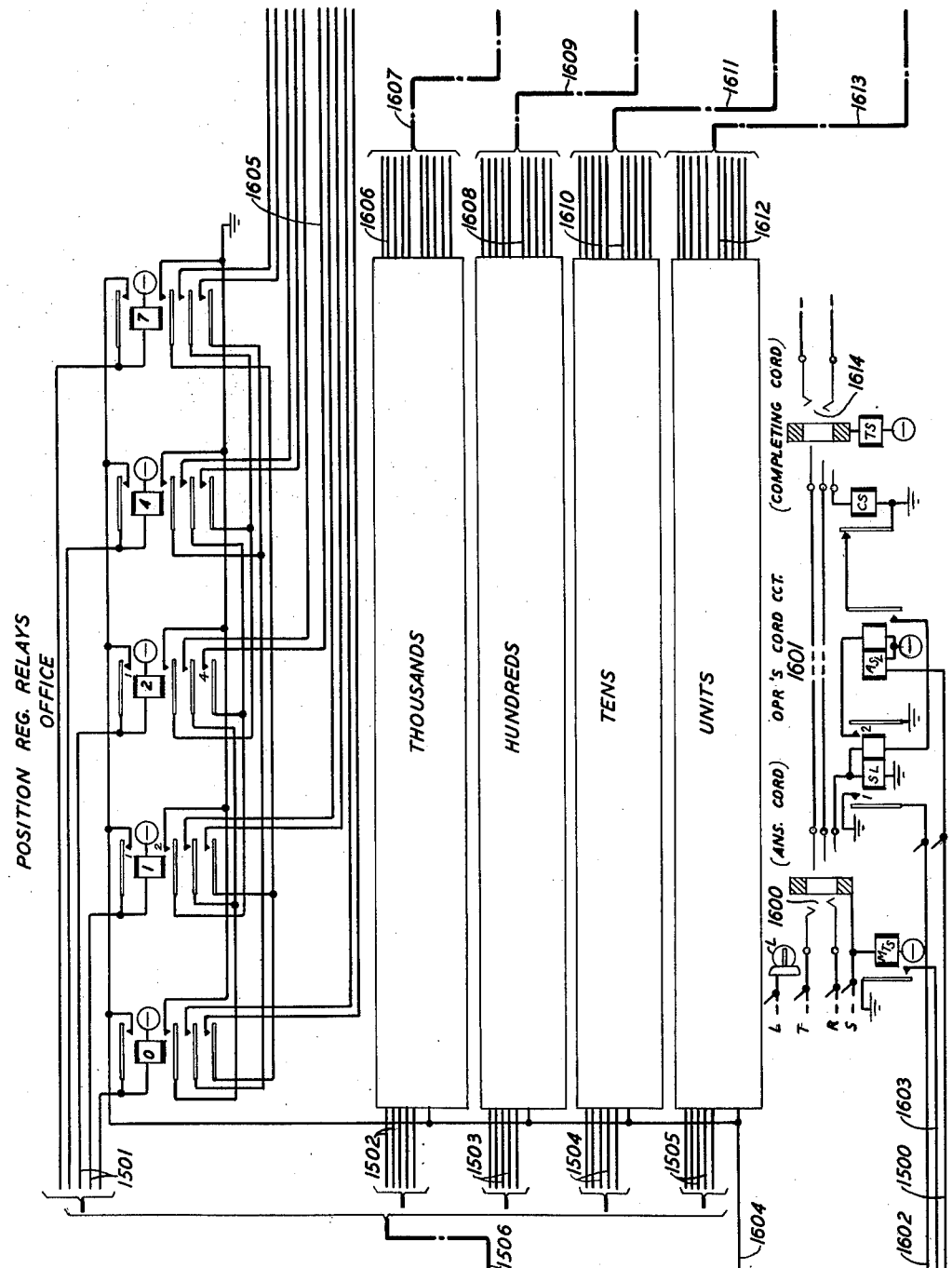
Figure 17:
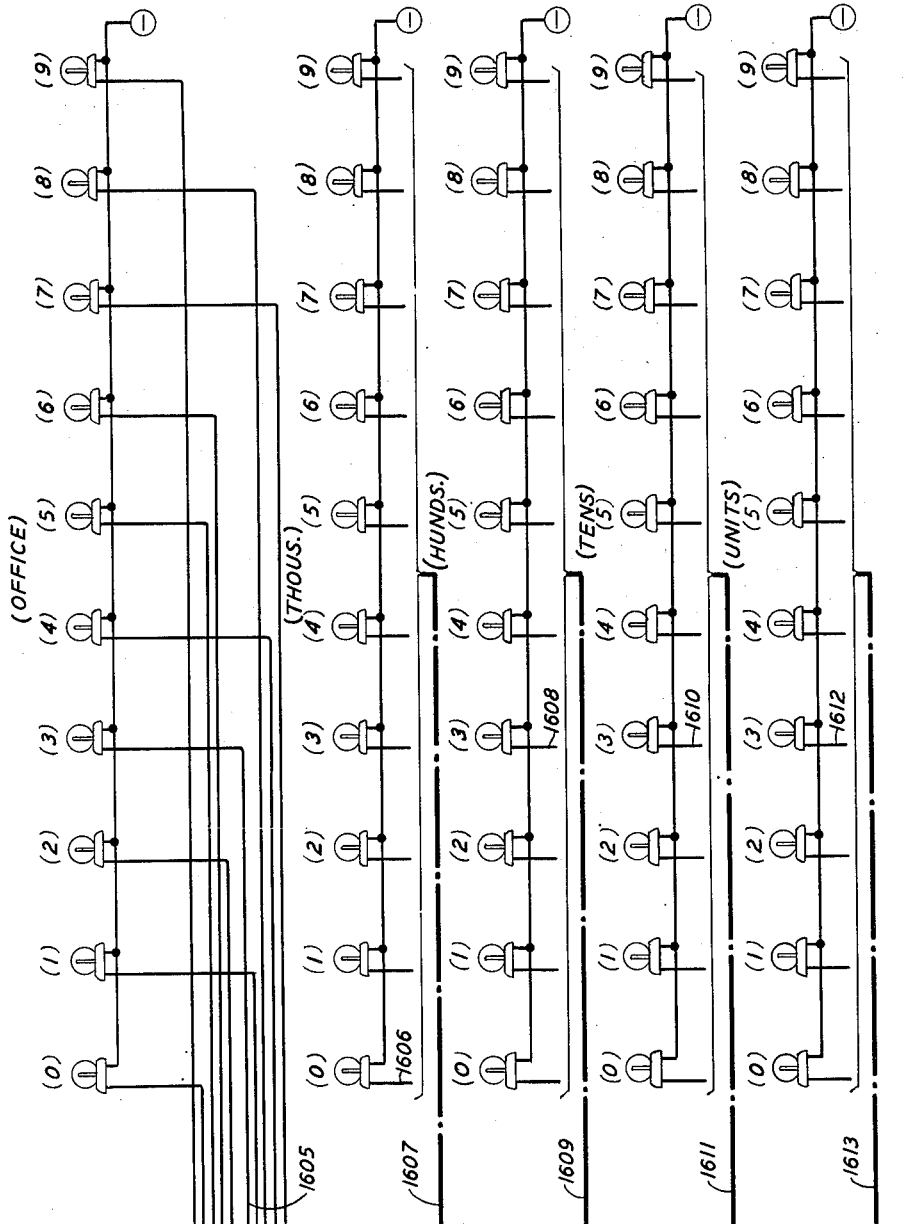
Figure 18:
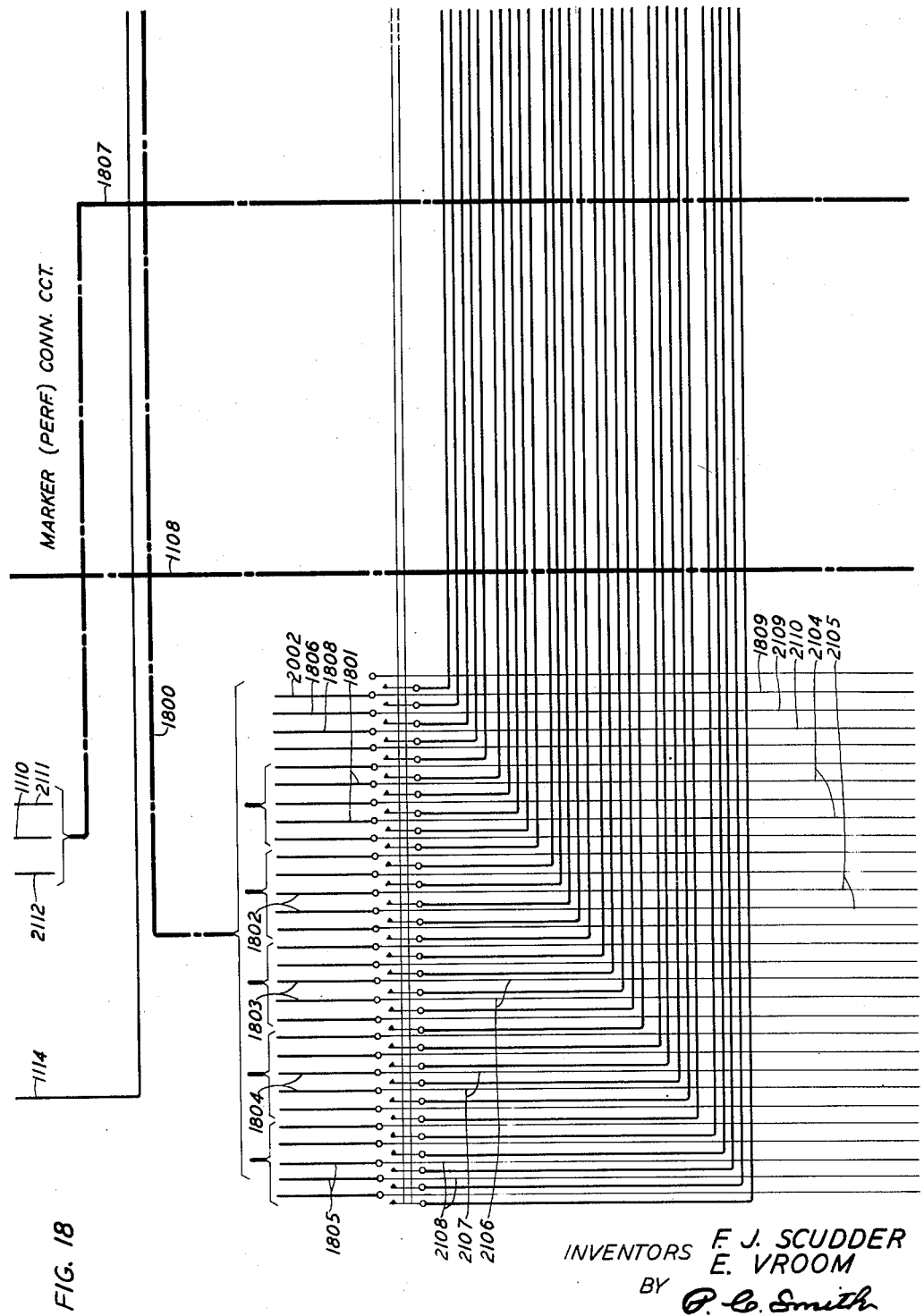
Figure 19:
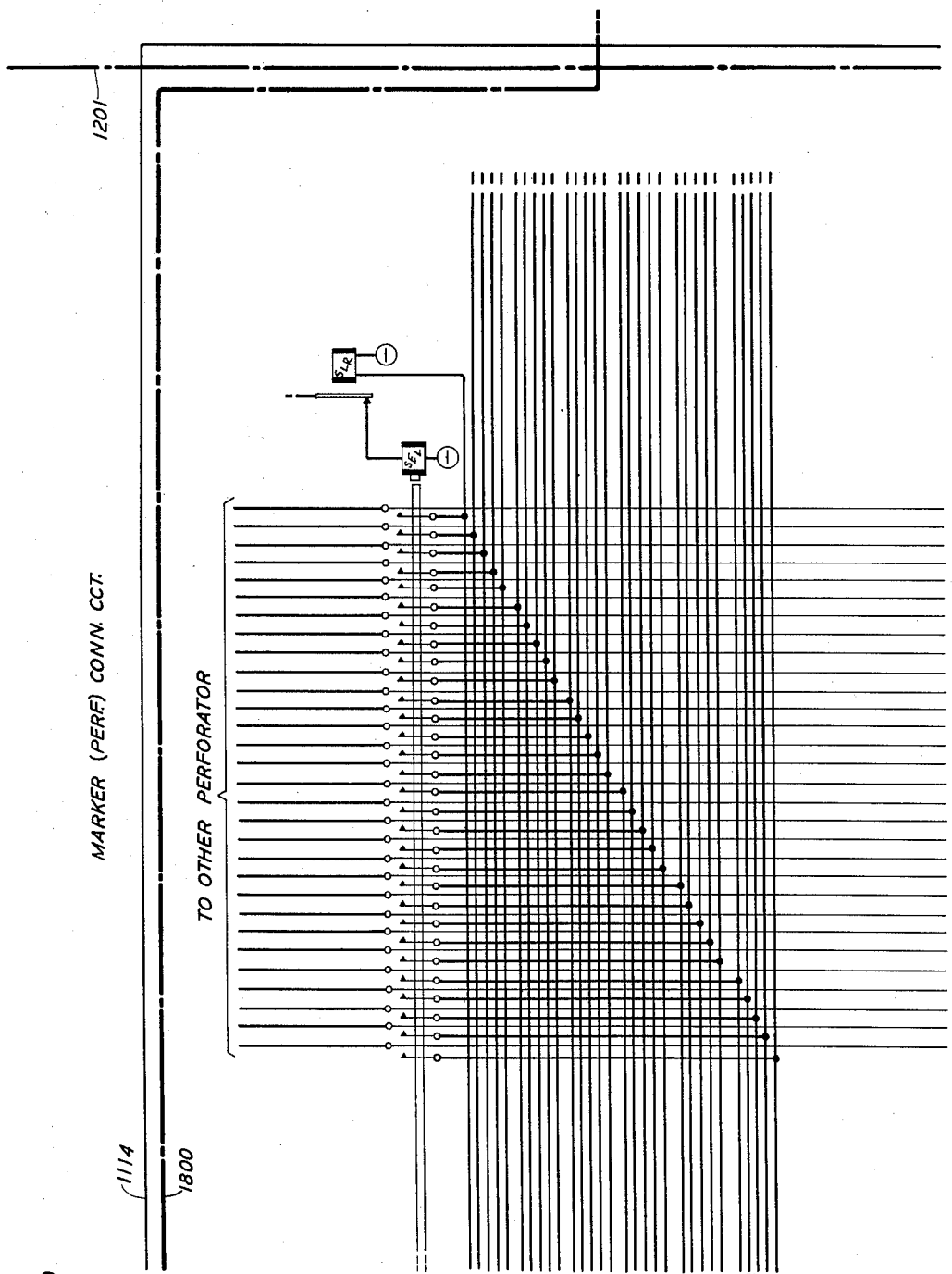
Figure 20:
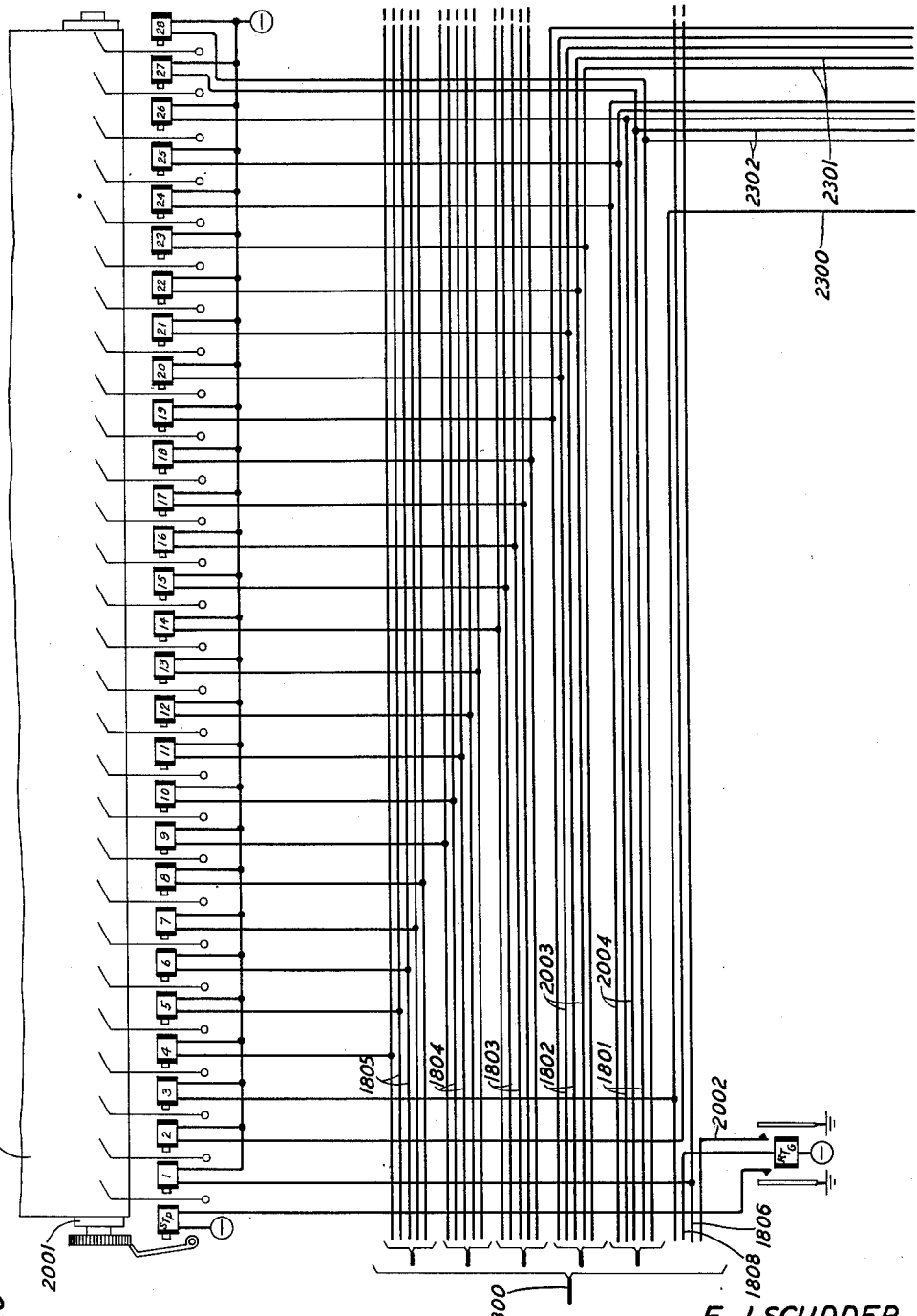
Figure 21:
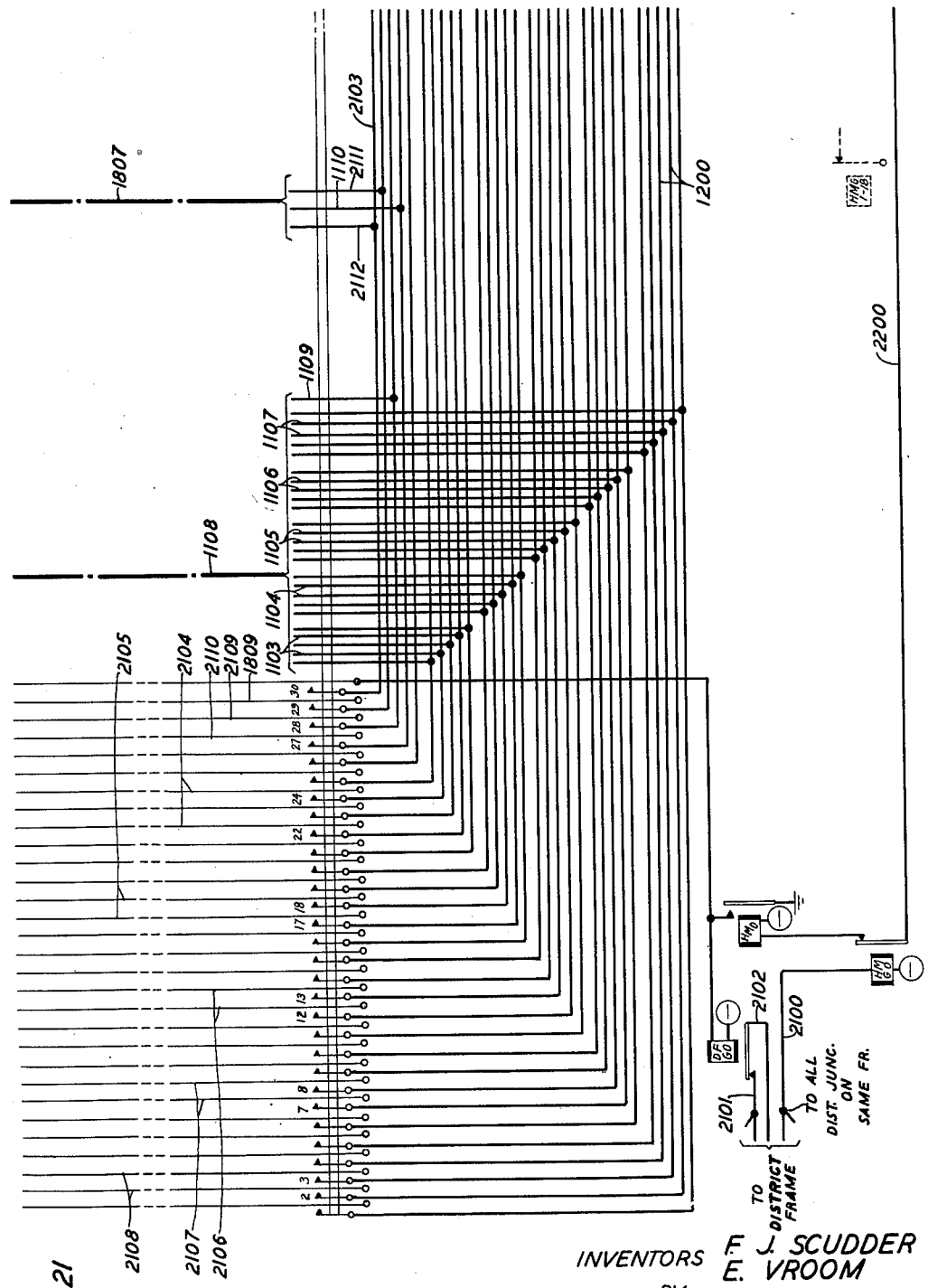
Figure 23:
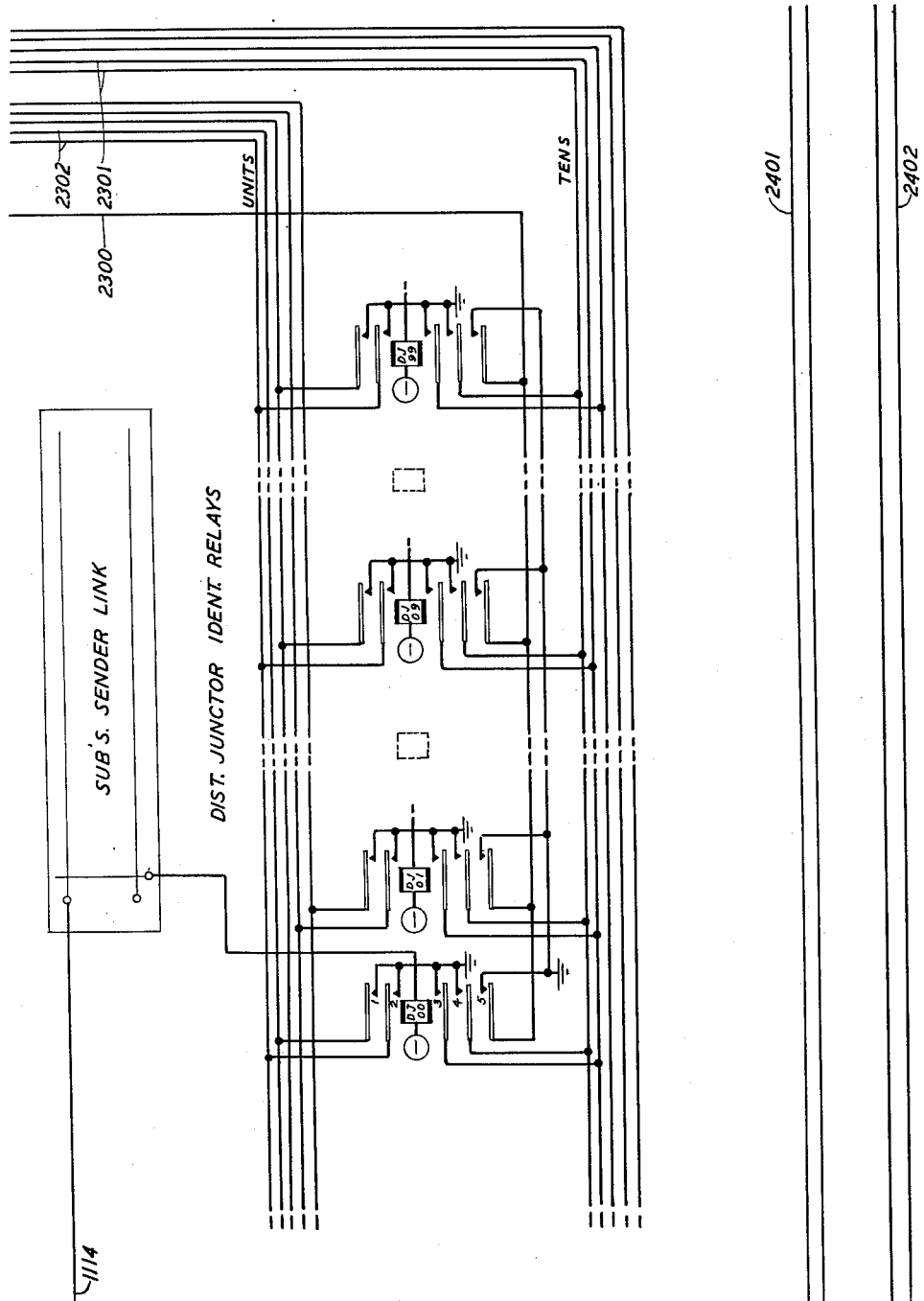
Figure 24:
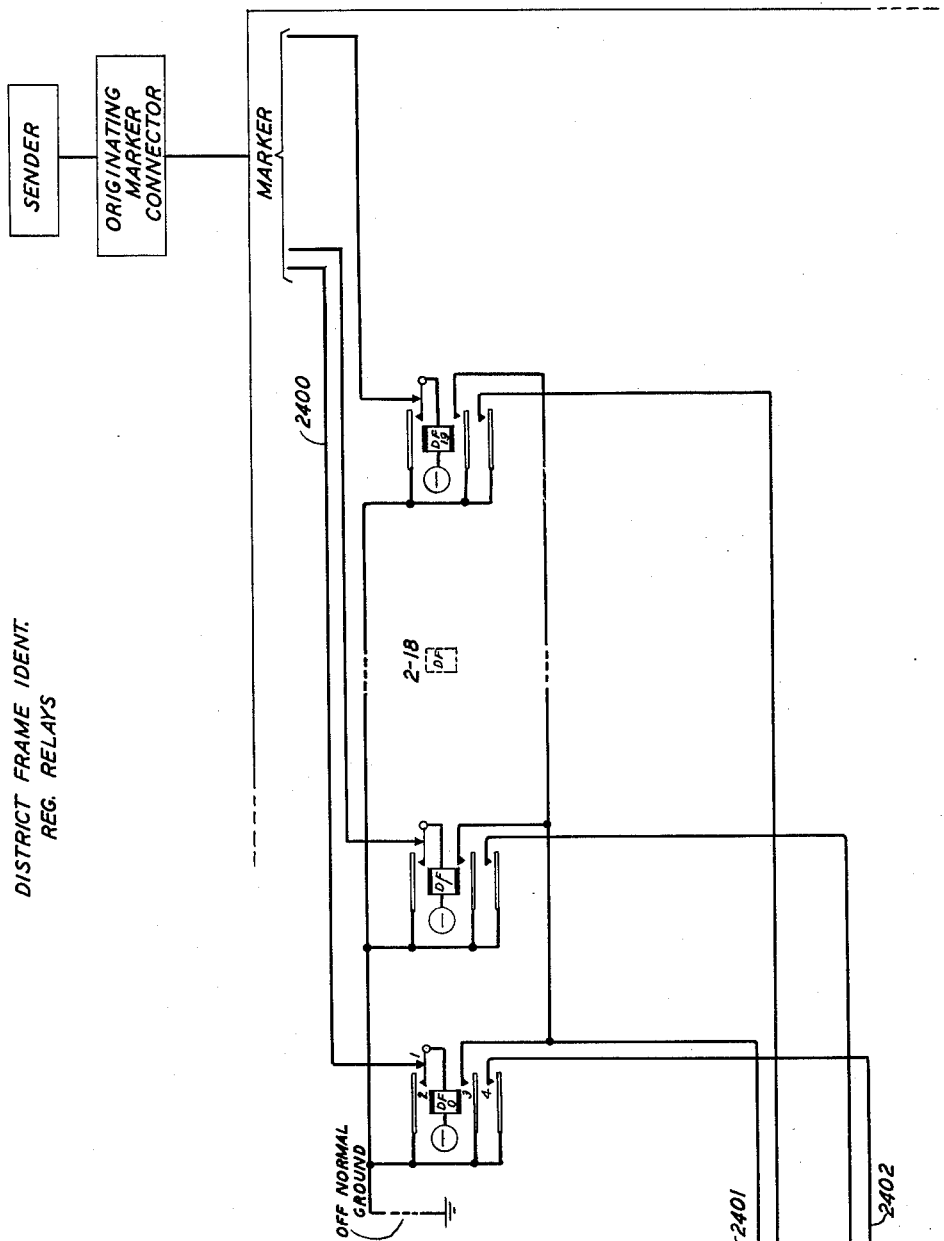

Fig. 3 discloses calling line location registers of a marker;

Fig. 4 illustrates a marker-translator connector;

Figs. 5 and 6 show a translator;

Fig. 7 discloses a translator-marker connector;

Fig. 8 discloses calling line directory number and class-of-service registers;

Fig. 9, in the upper part thereof, show class-of-service relays and called office code points, and, in the lower part thereof, route relays;

Fig. 10 illustrates a cross bar called number register in a sender;

Fig. 11 discloses a marker-perforator connector and part of the control mechanism used in perforating the called number;

Fig. 12 illustrates the switching mechanism of the marker for transferring the calling directory number either to a perforator or to an operator's position;

Fig. 20 shows a perforator mechanism;

Figs. 18, 19, 21 and 22 illustrate a cross-bar switching arrangement whereby markers and perforators may be interconnected;

Fig. 23 discloses district junctor identification relays;

Fig. 24 discloses district frame identification register relays;

Fig. 13 shows a marker-trunk register connector;

Fig. 14 illustrates calling directory number trunk registers;

Fig. 15 discloses a trunk register-operator's position connector;

Figs. 16 and 17 show respectively position register relays and calling directory number display lamps; and Fig. 25 shows how the other figures of the drawing may be arranged to disclose the invention.

GENERAL DESCRIPTION

The present invention may be used in and with an automatic telephone system such as is disclosed in Patent 2,235,803 to W. W. Carpenter of March 18, 1941, or in Patent 2,089,921 to W. W. Carpenter of August 10, 1937, or in the copending application, Serial No. 759,402, of W. W. Carpenter and R. E. Collis, filed July 7, 1947. The latter disclosure shows an automatic message accounting system adapted to such a telephone system as is disclosed in the above Carpenter patents. In the Carpenter-Collis disclosure various items of information concerning a call to be charged, such as the called number, the calling number, the duration of conversation, and the number of the district junctor used on the call, among others, are automatically recorded at suitable times upon tapes by controlled perforating machines, one of which machines is common to all junctors on a particular district junctor frame. The mechanism of a suitable such perforating machine is disclosed in Patent 2,583,086 to W. W. Carpenter of January 22, 1952. Such a perforating machine is diagrammatically shown in Fig. 20 of the present drawings and comprises twenty-eight punch magnets controlled as described hereinafter to perforate a tape in accordance with details of a call to be charged.

In automatic ticketing systems such as described in the above Carpenter-Collis disclosure, an "initial entry" is perforated in the tape at the start of a call, an "answer entry" is made when the called party answers the call, and a "final entry" is made at the end of the conversation. Since the present invention is concerned with only the initial entry, the final entry description will not be provided. The perforator has twenty-eight magnet-controlled perforating pins arranged in five groups of five pins each, and one group of three pins for special entries. Each group of five pins represents a digit which may be any one of the digits 0 to 9 according to the combination of any two-out-of-five pins which are selected. That is, each digit is represented by a particular two-out-of-five pins according to the following code:

| Digit | Pin Numbers | | | | | Digit | Pin Numbers | | | | |
|---|---|---|---|---|---|---|---|---|---|---|---|
| | 0 | 1 | 2 | 4 | 7 | | 0 | 1 | 2 | 4 | 7 |
| 0 | | | | X | X | 5 | | X | | X | |
| 1 | X | X | | | | 6 | | | X | X | |
| 2 | X | | X | | | 7 | | | | X | X |
| 3 | | X | X | | | 8 | X | | X | | |
| 4 | X | | | X | | 9 | | | | X | X |

An initial entry comprises, among other possible items of information, (1) the called line number (five digits), (2) the called line office code (three digits), (3) the calling line number (five digits), (4) the district junctor number (two digits), (5) the date and time, etc., plus special entries, in the above-mentioned three pin groups, for control purposes.

In the present arrangement, it is one of the functions of the common control equipment, an originating marker in this case, to assemble such information, to secure and make connection to the proper recorder or perforator and to effect the recording of such information on the tape for calls automatically extended.

In the event that a call is to be routed to an operator who will record the information and extend the connection, it is not necessary to record such information in the perforator. The marker will, in such a case, effect a display at the operator's position of the calling line's directory number for charging purposes.

With reference to the block diagram layout of Fig. 26 and to details of such a system shown in the above Carpenter patents, the operation of such a system, prior to the changes influenced by the present invention, is well known and will not be described in detail herein. A general description, however, will be set forth as a background for the application of features of the present invention.

When a call is originated by a calling line, a line-link controller circuit is associated therewith. The control circuit chooses one of the calling lines, if there are more than one in a calling condition, and, without making connection thereto, tentatively selects a group of district junctors which may serve said line. The control circuit then connects to a subscriber sender link and controller circuit which will effect the interconnection of a junctor with a sender. The sender link control circuit, having determined that it has access to an idle subscriber sender, interconnects the sender with a district junctor over a subscriber sender link, and effects, under the action of the line-link control circuit, the interconnection of the calling line with the selected junctor over a line link.

The line-link control circuit registers the equipment location of the calling line by means of such items of information as translator line group, switch number, column number, and vertical file number, the primary line switch frames comprising a plurality of stacked and numbered cross-bar switches of which the verticals are divided into columns, the latter composed of a number of vertical files. This registration is passed to the sender where it is registered and held for use by a marker, for instance, in future operations concerning the call.

The calling subscriber dials the called number and called office code which are registered in the sender for future transfer to a marker, which marker will, according to the office code of the called subscriber, connect the junctor through a district link, an office junctor and an office link, to a suitable trunk outgoing to a called subscriber or to an operator's position.

The present invention is concerned with aspects of sender and marker operation which effect the recording of items of information pertaining to a call which is to be ticketed, or which effect a visual display at an operator's position of such information, where, in either case, the trunk chosen by the marker is so chosen under control of both the class of service of the calling line and the office code of the called line. These functions can be understood from the disclosed details of parts of the system components which are shown cross-hatched in Fig. 26.

DETAILED DESCRIPTION—NORMAL NON-OPERATOR CALL

*Registration of calling line identification in sender*

It will be assumed, for purposes of illustration, that the calling subscriber's line circuit location information is translator line group (TLG) zero, column (CU) zero, switch (SW) one, and vertical file (VF) zero, that the calling subscriber is a tip party, that the calling subscriber's class of service (CS) is zero, and that the directory number of the calling subscriber's line is 3-0333.

Figure 1:
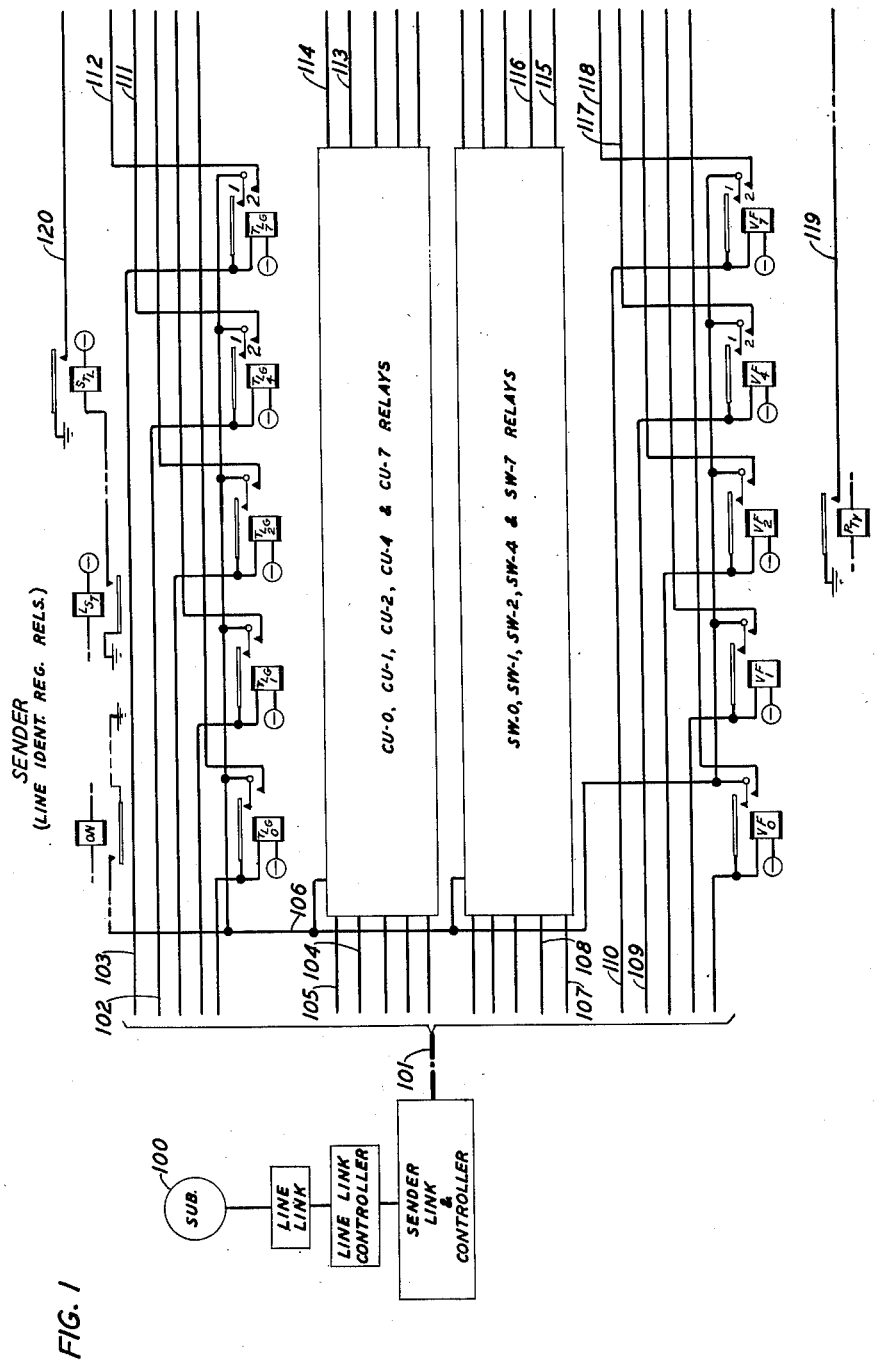
Fig. 1 shows calling line location registers of a sender.

It is assumed that a sender has been selected for use and that the calling line location information has been registered therein, upon the registers shown in Fig. 1, through the agency of the line-link controller. The off-normal relay ON(1) in the sender will be operated as usual and, since it is assumed that the calling subscriber is a tip party, the party relay PTY(1) will be released.

The term "translator line group" is used to denote the fact that calling lines are divided into groups of 1000 or less lines, each such group having an associated translator capable of translating the line location of a calling line thereof into its directory number. It is necessary that the translator line group number (representing a group of 1000 numbers, such as group 0 for directory numbers from 0000 to 0999, and group 1 for numbers from 1000 to 1999, etc.) be known to the sender, and subsequently to the marker, in order for the marker to make interconnection with the translator associated with the calling line whose directory number may be required for billing purposes.

It has been assumed that the line group within which the calling line 100 is located is zero. Register relays TLG4(1) and TLG7(1) will be operated over cable 101, conductors 102 and 103 to batteries through the respective windings of relays TLG4(1) and TLG7(1). Relays TLG4(1) and TLG7(1) operate and lock over their contacts 1 to ground over the contact of relay ON(1).

In a similar manner, under the assumption that the column within which the calling line is terminated is column zero, relays CU4(1) and CU7(1), not shown, will be operated over cable 101 and conductors 104 and 105. Relays CU4(1) and CU7(1) will lock to ground on conductor 106 over the contact of relay ON(1).

The switch number associated with the calling subscriber's line circuit termination has been assumed to be 1. Therefore relays SW0(1) and SW1(1), not shown, will operate over cable 101 and conductors 107 and 108 and will lock to ground on conductor 106.

In a similar fashion, assuming the vertical file number of the calling line to be zero, relays VF4(1) and VF7(1) will be operated in circuits extending from ground (not shown) over cable 101, conductors 109 and 110, to batteries through respective windings of relays VF4(1) and VF7(1). Relays VF4(1) and VF7(1) operate and lock to ground on conductor 106 over their respective contacts 1.

The above calling line identification relays of the sender are assumed to be operated in parallel with any other such relays in the sender required for regular or other purposes not directly pertinent to the present invention.

Figure 2:
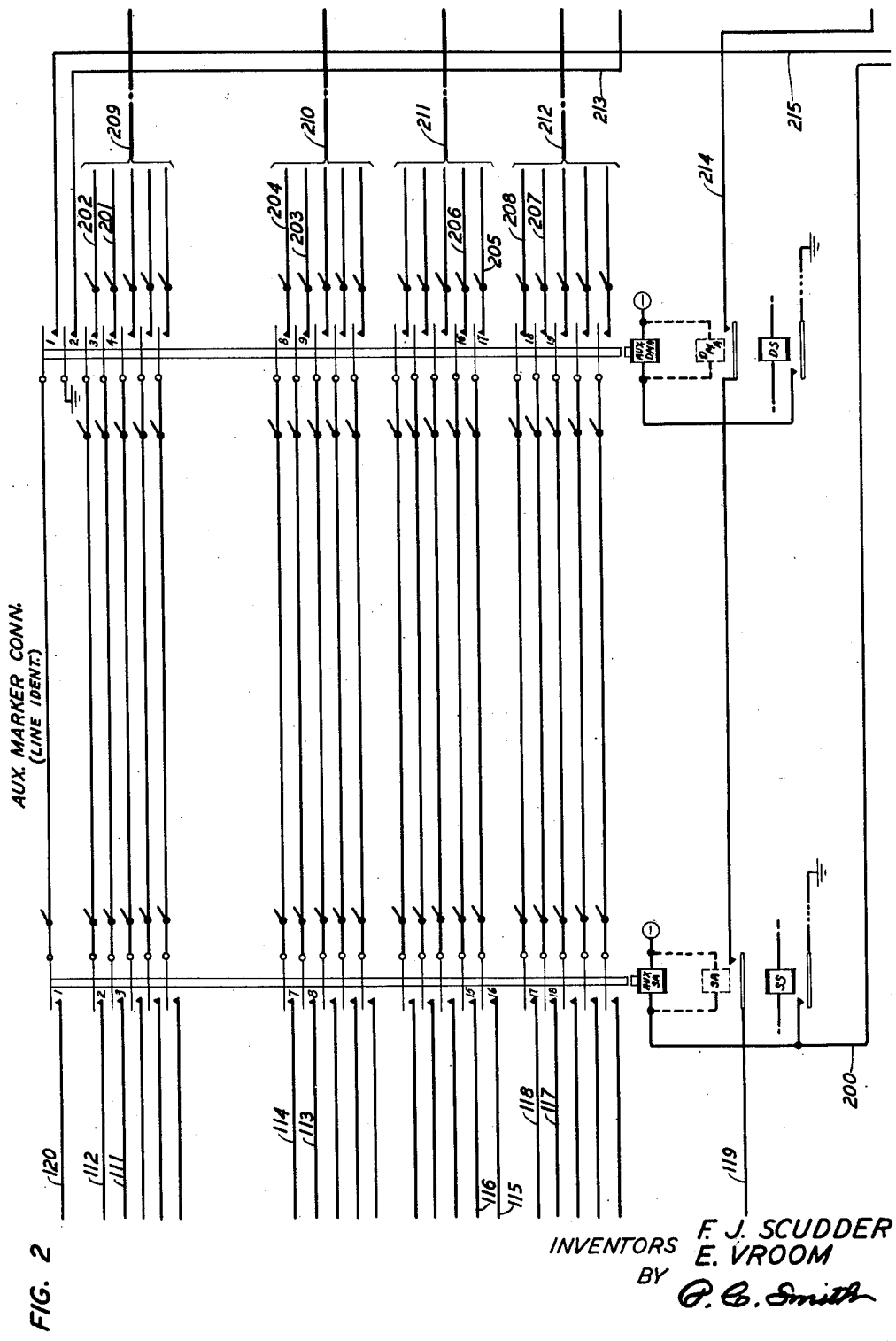
Fig. 2 illustrates a sender-marker connector.

The operation of relays TLG4(1), TLG7(1), CU4(1), CU7(1), SW0(1), SW1(1), VF4(1) and VF7(1) place ground on two conductors for each register extending to a marker connector, shown in Fig. 2, which is auxiliary to the regular connectors associated with the aspects of such a telephone system not involving the present invention. Relays TLG4(1) and TLG7(1), upon operating, extend ground on conductor 106, over their respective contacts 1 and 2, to and over conductors 111 and 112. Relays CU4(1) and CU7(1), in a like manner, extend ground to and over conductors 113 and 114. Likewise, relays SW0(1) and SW1(1) place ground on conductors 115 and 116; and, relays VF4(1) and VF7(1) place ground on conductors 117 and 118.

*Registration of called line directory number in sender*

After the sender has been seized by the subscriber sender link and controller, and after that sender has been interconnected with the calling line and with a junctor over a subscriber sender link (see Fig. 26), the calling subscriber, as a result of hearing dial tone transmitted over the line, will commence to dial the called line directory number which, it will be assumed, comprises the number FLA-3333-J. Such number, as is well known, comprises the A, B and C office code digits 352, the thousands-hundreds-tens-units digits 3333, and the party digit (letter) 5.

Fig. 10 shows in skeletonized form a cross-bar dial register which may be of the type shown in the disclosure of Patent 2,106,360 to R. Raymond of January 25, 1938. It comprises ten select magnets 0(10) to 9(10) arranged horizontally at the top of Fig. 10, and eight hold magnets A(10) to STA(10) arranged vertically at the left of Fig. 10. As is well known, the sender will count the impulses in the first or A digit, say 3, and at the end of such digit dialing, will operate select magnet 3(10) over conductor 1000 and will subsequently operate hold magnet A(10) (which locks locally in the sender) and release select magnet 3(10) prior to the end of the second or B digit, say 5, dialed by the calling subscriber. The above sequence of switch operations, as is well known, effects the operation of contacts 1 and 2 associated with select magnet 3(10), thereby applying ground over conductors 1001 and 1002 respectively.

In a like manner each of the succeeding digits of the called number will be registered by the operation of a select magnet corresponding to the digit followed by the operation and locking of the hold magnet particular to the position of that digit in the called directory number and followed by the release of the operated select magnet. Without going into unnecessary detail, it will be appreciated that the registration of successive digits accomplishes the following:

1. A digit 3—contacts 1 and 2 magnet 3(10)—grounds leads 1001 and 1002;
2. B digit 5—contacts 3 and 4 magnet 5(10)—grounds leads 1003 and 1004;
3. C digit 2—contacts 5 and 6 magnet 2(10)—grounds leads 1005 and 1006;
4. The digit 3—contacts 7 and 8 magnet 3(10)—grounds leads 1007 and 1008;
5. H digit 3—contacts 9 and 10 magnet 3(10)—grounds leads 1009 and 1010;
6. T digit 3—contacts 11 and 12 magnet 3(10)—grounds leads 1011 and 1012;
7. U digit 3—contacts 13 and 14 magnet 3(10)—grounds leads 1013 and 1014;
8. Party digit 5—contacts 15 and 16 magnet 5(10)—grounds leads 1015 and 1016.

This cross-bar dial register is assumed to operate in parallel with any other such register in the sender used for other purposes.

The grounded conductors 1001 to 1016 are extended over cables 1017 to 1024, to conductors 1001 to 1016, extending to a marker connector, shown in Fig. 11, which is auxiliary to regular marker connectors not particularly associated with the present invention.

The so-called "regular marker connectors," above mentioned, have been illustrated in dotted lines in Fig. 2 as connector relays SA(2) and DMA(2), in parallel with which the auxiliary connectors necessary for the functioning of the present invention are operated, as will be explained.

*Calling line location to marker*

Since the rapidity of the registration of the called line directory number is dependent upon the speed with which such digits are transmitted, the sender will be ready to seize an idle marker and to initiate further control functions pertinent to the registration of the calling line identification at an earlier time.

Pursuant to selection and seizure of an idle originating marker, by the sender which is in use, relays SS(2) and DS(2) are operated to complete circuits for operating the auxiliary marker connector relays AUXSA(2), AUXDMA(2) and AUXSA'(11) in parallel with the regular connectors SA(2) and DMA(2). Relay AUXDMA(2) operates in a circuit extending from ground, over the contact of relay DS(2), to battery through the winding of relay AUXDMA(2). Relay AUXSA(2) operates in a circuit extending from ground over the contact of relay SS(2), to battery through the winding of relay AUXSA(2). Relay AUXSA'(11) operates in a circuit extending from ground over the contact of relay SS(2), conductor 200, to battery through the winding of relay AUXSA'(11).

Upon the operation of connector relay AUXSA'(11) the grounds on conductors 1001 to 1006 are extended in three pairs over contacts 2 and 3, 7 and 9, and 11 and 13 of relay AUXSA' (11) to armatures 2 and 3, 7 and 9, and 11 and 13 of the office code connector relay CODE(11). Likewise, the grounds on conductors 1007 to 1016 are extended in five pairs over contacts 17 and 18, 22 and 23, 27 and 28, 32 and 33, and 37 and 39 of relay AUXSA'(11) to armatures 2 and 3, 7 and 8, 12 and 13, 17 and 18, and 22 and 24 of the directory numericals relay NUM(11). Upon the operation of relay CODE(11), as will be seen from subsequent description, the three office code digits of the called subscriber may be transmitted to the perforator for inclusion in the initial entry made for the call on the tape. In a similar fashion, at the appropriate time, relay NUM(11), upon operating, will transmit the four numericals and party letter, if any.

Upon the operation of the marker connector relays AUXSA(2) and AUXDMA(2), the calling line identification relays of the marker (see Fig. 3) are operated and locked locally to transfer the identification from the sender to the marker. Relays TLG4(3) and TLG7(3) are operated in circuits extending from grounds on conductors 111 and 112, contacts 3 and 2 of relay AUXSA(2), contacts 4 and 3 of relay AUXDMA(2), conductors 201 and 202, cable 209, conductors 201 and 202, to batteries through the respective windings of relays TLG4(3) and TLG7(3). Relays TLG4(3) and TLG7(3) operate and lock to off-normal ground on conductor 300 in the marker over their respective contacts 1. In a similar fashion, relays CU4(3) and CU7(3), not shown, are operated from ground on conductors 113 and 114, over contacts 8 and 7 of relay AUXSA(2), contacts 9 and 8 of relay AUXDMA(2), conductors 203 and 204, cable 210, and over conductors 203 and 204. Relays CU4(3) and CU7(3), not shown, operate and lock to ground on conductor 300. Relays SW0(3) and SW1(3), not shown, are operated in circuits extending from grounds on conductors 115 and 116, over contacts 16 and 15 of relay AUXSA(2), contacts 17 and 16 of relay AUXDMA(2), conductors 205 and 206, cable 211, and conductors 205 and 206. Relays SW0(3) and SW1(3) operate and lock to ground on conductor 300. Relays VF4(3) and VF7(3) are operated in circuits extending from grounds on conductors 117 and 118, over contacts 18 and 17 of relay AUXSA(2), contacts 19 and 18 of relay AUXDMA(2), conductors 207 and 208, cable 212, conductors 207 and 208, to respective batteries through the windings of relays VF4(3) and VF7(3). Relays VF4(3) and VF7(3) operate and lock to off-normal ground on conductor 300 over their respective contacts 1.

Each of the group of five relays shown in Fig. 3 for registering the associated item of calling line location information, on a two-out-of-five basis, is arranged to translate the two-out-of-five input into a one-out-of-ten output. For instance, relays TLG4(3) and TLG7(3), upon operating to register the thousands line group zero on a two-out-of-five basis, are arranged to ground only one conductor 301 out of ten such conductors representing the ten possible digital values of such line groups. Conductor 301 is grounded in a circuit extending from ground over contact 2 of relay TLG4(3), and over contact 4 of relay TLG7(3), to conductor 301. Likewise, conductor 302 is grounded by the operated relays CU4(3) and CU7(3), not shown, to indicate, on a one-out-of-ten basis, that the calling line is located in column zero. In a similar fashion, conductor 303 is grounded by the operation of relays SW0(3) and SW1(3) to indicate that the calling line appears in switch 1. Lastly, conductor 304 is grounded through the winding of relay SGE(3), over contact 2 of relay VF4(3) and over contact 4 of relay VF7(3) as an indication, on a one-out-of-ten basis, that the calling line terminates in vertical file zero of the indicated switch and column in line group zero.

*Selection of translator and interconnection of marker therewith*

Upon the operation of the connector relay AUXDMA(2), a circuit was completed for operating the translator preference relay TPF(4) associated with the marker selected for use. Relay TPF(4) is arranged in a preference lock-out circuit with other preference relays associated with other equipments, such as markers, which may have access to the translators. Assuming that the translators are idle, relay TPF(4) is operated in a circuit extending from ground, over contact 2 of relay AUXDMA(2), conductor 213, contact 1 of relay CSO(3), conductor 305, to battery through the winding of relay TPF(4) and through the preference lock-out circuit of such preference relays. Relay TPF(4), upon operating, among other functions to be described presently, locks out other preference relays while the translators are in use. Relay TPF(4) locks over its contact 1 to off-normal ground in the marker under the control of a circuit (not shown) indicated as a dotted line. The latter circuit (not shown) is the well-known type of integrity check circuit which will open this holding circuit when it is satisfied that the marker has received from the translator all of the information requested. In the present disclosure, such a check circuit would be associated with the calling line directory number and class-of-service registers shown in Fig. 8, and such circuit, upon checking that each such register has been operated properly to register an item of information, would then open the locking circuit of relay TPF(4). This will permit other markers to have access to such translators without waiting for the present marker to finish all of its other off-normal functions.

Relay TPF(4), upon operating, completes circuits for operating connector relays MT0(4) and TRI(7). Relay MT0(4) operates in an obvious circuit over contact 12 of relay TPF(4). Relay TRI(7) operates in a circuit extending from ground, over contact 12 of relay TPF(4), conductor 400, to battery through the winding of connector relay TRI(7). Relay MT0(4), upon operating, extends ground on conductors 302, 303 and 304, from the calling line location register relays of Fig. 3 in the marker, over respective cables 307, 308 and 309, conductors 302, 303 and 304, contacts 10, 19 and 30 of relay MT0(4), to the No. 10, No. 19 and No. 30 contacts of each relay TIN-(4) associated with one of the ten translator line groups. These translator connector relays TIN-(4), such as relay TIN0(4) for translator line group zero, connect the grounded conductors of the marker to a particular translator depending upon the translator line group within which the calling line is allocated, as will be explained. The connector relay TRI(7), similarly to connector relay MT0(4), connects the output of the selected translator (the selection being determined by connector relay TR0(7) which operates in parallel with relay TIN0(4), as will be explained) to registers in the marker, shown in Fig. 8, which will register and lock the translated information.

Upon the operation of relay TPF(4), relays TIN0(4) and TR0(7) operate in a circuit extending from ground on conductor 301, cable 306, conductor 301, contact 11 of relay TPF(4), to battery through the winding of relay TIN0(4), and in parallel, over conductor 401, to battery through the winding of relay TR0(7). The operation of relays MT0(4) and TRI(7) and of relays TIN0(4) and TR0(7) completes the selection of the translator and the interconnection of the marker to the input and output of the translator preparatory to effecting the actual translation.

*Translation of calling line location to calling line directory number*

The translator, shown briefly in Figs. 5 and 6, comprises a relay "tree" arrangement well known in the art as a means of resolving the three items of information, column number (0 to 9), switch number (0 to 9), vertical file number (0 to 9) and party (tip or ring) into a single energized conductor individual to the calling line.

The registration of column zero above, operates two relays U0(5) and U'0(5). If the column number were 5, for example, two other relays (not shown) U5 and U'5 would be operated. The former relay U0(5) pertains to tip parties and the latter, U'0(5), to ring parties. The circuit for operating relays U0(5) and U'0(5) extends from ground on contact 10 of relay MT0(4), over contact 10 of relay TIN0(4), conductor 402, to batteries through the windings of relays U0(5) and U'0(5) in parallel.

There are ten relays SW0(5) to SW9 (not shown), each of which extends ten conductors to each U- and U'- relay, as shown for relays SW0(5) and SW1(5). Thus the operation of a set of U- and U'- relays and one of the relays SW0(5) to SW9 (not shown), the relay tree has narrowed the translation down to one of ten conductors. Relay SW1(5) is operated in a circuit from ground on contact 19 of relay MT0(4), over contact 19 of relay TIN0(4), conductor 403, to battery through the winding of relay SW1(5).

The party relay PTY(5) will be unoperated if the calling subscriber is a tip party, as assumed, and will be operated if such party be a ring party. It has been assumed that the calling subscriber is a tip party; therefore, relay PTY(1) in the sender will be unoperated. If the calling subscriber were a ring party, the sender party test function would have resulted in the operation of relay PTY(1), thereby to have completed a circuit for operating relay PTY(5) extending from ground, over the contact of relay PTY(1), conductor 119, contact of relay SA(2), contact of relay DMA(2), conductor 214, contacts 31 of relays MT0(4) and TIN0(4), conductor 405, to battery through the winding of relay PTY(5). If operated, relay PTY(5), under the control of an operated relay SW0(5) to SW9 (not shown), extends ten conductors to a U'- relay for ring party translation. If unoperated, as assumed, relay PTY(5), under the control of an operated relay SW0(5) to SW9 (not shown), extends ten conductors to a U- relay for tip party translation.

The vertical file identification which grounded conductor 304 through the winding of relay SGE(3) extends the ground over conductor 304, cable 309, conductor 304, contacts 30 of relays MT0(4) and TIN0(4), conductor 404, contact 19 of relay PTY(5), contact 10 of relay SW1(5), conductor 500, cable 401, conductor 500, contact 20 of relay U0(5), conductor 504, cable 505, conductor 504, to battery through the winding of relay TIP(6) individual to the calling subscriber whose directory number is 3–0333 and whose class of service is zero. If the calling subscriber were a ring party, the ground on conductor 404 would be extended over contact 20 of reay PTY(5), contact 20 of relay SW1(5), conductor 502, cable 503, conductor 502, contact 20 of relay U'0(5), conductor 506, cable 507, conductor 506 to battery through the winding of relay RING(6) individual to the calling subscriber whose directory number is 2–0333 and whose class of service is six.

Relays TIP(6) and SGE(3) operate in series in the above circuit. Relay SGE(3), upon operating, operates relay SC0(3) in an obvious circuit. Relay SC0(3) locks to off-normal ground in the marker over its contact 2 and, at its contact 1, opens the operating circuit for preference relay TPF(4) which, however, is locked as previously described. At its contact 4, relay SC0(3) completes a circuit to be described later.

Relay TIP(6), upon operating, grounds, on a two-out-of-five basis, two bus bars for each digit of information pertaining to the calling subscriber individual to that relay. As arranged, relay TIP(6) grounds the following bus bars or conductors to indicate the associated information:

| Conductors Grounded | Information |
|---|---|
| 601, 602 | Office digit 3. |
| 614, 617 | Thousands digit 0. |
| 621, 622 | Hundreds digit 3. |
| 631, 632 | Tens digit 3. |
| 641, 642 | Units digit 3. |
| 654, 657 | Class of service 0. |

The grounds on conductors 654 and 657, indicating that the class of service to which the calling subscriber is entitled is zero, are extended over cable 650, conductors 654 and 657, contacts 2 and 1 of relay TR0(7), contacts 2 and 1 of relay TR1(7), conductors 754 and 757, cable 750, conductors 754 and 757, to batteries over contacts 1 and through respective windings of relays 4(8) and 7(8) of the class-of-service register in the marker. Relays 4(8) and 7(8) of the class-of-service register operate and lock to off-normal ground in the marker over their respective contacts 2. These class-of-service relays 4(8) and 7(8) are arranged to translate the two-out-of-five registration of the class zero into a one-out-of-ten indication by grounding conductor 800 in a circuit extending from off-normal ground, over contact 3 of relay 4(8), contact 5 of relay 7(8), to conductor 800, and over cable 801 and conductor 800, to battery through the winding of the zero class-of-service relay S0(9), which thereupon operates.

The grounds on conductors 641 and 642, indicating that the units digit of the calling subscriber's directory number is 3, are extended over cable 640, conductors 641 and 642, contacts 9 and 8 of relay TR0(7), contacts 9 and 8 of relay TR1(7), conductors 741 and 742, cable 740, conductors 741 and 742, to batteries over the respective contacts 1 and through the respective windings of relays 1(8) and 2(8) of the units register. These relays 1(8) and 2(8) operate and lock to off-normal ground over their contacts 2. Relays 1(8) and 2(8) of the units register ground, over their contacts 3, respective conductors 802 and 803 as a two-out-of-five indication that the units digit of the calling subscriber's directory number is 3.

Ground on conductors 631 and 632 is likewise extended to conductors 731 and 732 to operate relays 1 (not shown) and 2 (not shown) in the tens register to thereby ground conductors 804 and 805 as an indication that the tens digit is 3.

The hundreds digit 3 is indicated in a like manner when conductors 721 and 722 are grounded to operate relays 1 (not shown) and 2 (not shown) in the hundreds register to in turn ground conductors 806 and 807.

Similarly, relays 4 (not shown) and 7 (not shown) of the thousands register are operated by grounds on conductors 714 and 717, to in turn ground conductors 808 and 809 as an indication that the thousands digit is zero.

Likewise, the office digit 3 is indicated by ground on conductors 810 and 811 resulting from the operation of relays 1 (not shown) and 2 (not shown) of the office register by ground extended to conductors 701 and 702.

The various grounds on conductors 802 to 811 are extended through cable 812, to Fig. 12, where these various conductors ground five pairs of armatures on each of the connector relays CLN(12) and OPD(12). Thus the directory number of the calling subscriber is available on these armatures for one of two possible uses which the marker may make of such information. That is, if such information is to be recorded or perforated as part of the initial entry on a tape, as in a normal non-operator call, the connector relay CLN(12) will be operated and relay OPD(12) will be released, as will be discussed later. On the other hand, if the call is one which is to be routed to and completed by an operator, as will be discussed hereinafter, the relay OPD(12) will be operated and relay CLN(12) will be released.

*Release of translator and connectors*

As soon as the directory number and class-of-service registers of Fig. 8 in the marker have been operated and properly locked, a check circuit (not shown) previously mentioned and well known to the art, functions to open the locking circuit of relay TPF(4). Relay TPF(4), upon releasing, releases the connector relays MT0(4) and TR1(7) and connector relays TIN0(4) and TR0(7) thereby returning the translator of Figs. 5 and 6 completely to normal and disconnecting same from the marker, enabling other circuits to use the translator.

*Route relay operation*

As soon as the office code digits of the called party have been registered in the marker, a decoder responsive to such codes grounds a code point, as is well known, such as 900 or 901 of Fig. 9. Since the call under discussion here is a normal, non-operator call, a code point such as 900 will be grounded thereby to operate a non-operator route relay, such as relay R6(9). The operation of such a route relay R6(9), in a well-known fashion, provides the marker with sufficient routing information to enable the marker to extend and complete the connection desired by the calling party over a suitable trunk circuit.

*General information—perforating*

As mentioned previously, an initial entry for a call of the nature described above requires four "lines" on the perforated tape. The finished tape will look like the following which shows the arrangement of information punched on the tape without, of course, going into detail and without showing other information which may fill up the empty spaces on these lines:

Line 1—
 Called Numericals_____Thous. Hund. Tens Units Station
Line 2—Cal'ed Office Code_____A digit B digit C digit
Line 3—Calling Number__Office Thous. Hund. Tens Units
Line 4—District Junctor No_____Tens Units The description which follows shows in detail how each line is perforated.

*Seizing a perforator*

According to such an arrangement as is described in the above-referenced Carpenter-Collis disclosure, perforating machines are allocated to district junctor frames and a particular machine may be seized under the control of only those district junctors on the frame individual to that machine. In the present disclosure (see Figs. 18, 19, 21 and 22) a cross-bar switch arrangement is shown upon which the select magnets correspond to markers and the hold magnets correspond to perforators. Thus, in order to make interconnection between a marker and a perforator it is necessary first to operate the select magnet corresponding to the marker, and then to operate a hold magnet corresponding to the district junctor frame in use on the call to thereby interconnect a marker (a horizontal unit on the switch) with a perforator (a vertical unit on the switch).

As soon as the sender has transmitted to the marker (see Fig. 24) the number of the district frame used on the connection, one of relays DF0(24) to DF19(24) will operate. It will be assumed that the frame in use is frame zero. Ground (not shown) will be supplied from the sender to the marker, over conductor 2400, contact 1 of relay DF0(24), to battery through the winding of relay DFO(24). Relay DFO(24) operates and locks to off-normal ground over its contact 2.

Relay DFO(24), upon operating, applies ground over its contact 3, conductor 2401, through a lockout circuit (see Fig. 22) to prevent more than one select magnet from operating at one time, to battery through the winding of relay SLO(22). Relay SLO(22), upon operating, operates select magnet SEL0(22) and hold magnet connector relay HMC(22) in obvious circuits. The operation of select magnet SEL0(22), as is well known, conditions that horizontal unit such that upon the operation of any hold magnet there will be an interconection at the intersection of the horizontal unit and the vertical unit corresponding to the operated hold magnet. The operation of the hold magnet connector relay HMC(22) partially completes circuits for operating hold magnets.

Relay DFO(24), upon operating, applies ground over its contact 4, conductor 2402, contact 0 of relay HMC(22), conductor 2200, contact of relay HMG0(21), to battery through the winding of hold magnet HM0(21) which is associated with a particular perforator (see Fig. 20) and with a particular district frame, the identification of the number of which frame was effective to choose this particular hold magnet HM0(21). Assuming that relay HMG0(21) is released, hold magnet HM0(21) operates to close the cross-points shown at the left middle section of Fig. 21 thereby interconnecting the marker with the perforator.

District junctor frames have access to the same perforators through connectors, other than the cross-bar switch shown, for the purpose among perhaps others, to enter upon the tape, "answer entries" when called subscribers answer, and "final entries" at the end of conversations. Relay HMG0(21) is under the control of such a frame such that if the pertinent frame is busy in its associated perforator, relay HMG0(21), a hold magnet guard relay, will be operated over conductor 2100 thereby preventing the operation of hold magnet HM0(21) and precluding a double connection with the perforator. Likewise, upon the operation of hold magnet HM0(21) the district frame guard relay DFG0(21) is operated in an obvious circuit thereby opening at its contact part of the circuit (represented by conductors 2101 and 2102) by means of which a frame can seize the perforator. This prevents a double connection with the perforator in the reverse sense from the above double connection guard.

Assuming that relay HMG0(21) is released, hold magnet HM0(21) operates and in turn operates the guard relay DFG0(21) as above described. Hold magnet HM0(21), upon operating, operates the select magnet release relay SLR(22) in a circuit extending from ground, over the contact of hold magnet HM0(21), contact 30 of the closed cross-points, conductor 2103, to battery through the winding of relay SLR(22). Relay SLR(22), upon operating, releases select magnet SEL0(22) leaving the cross-point interconnection under the control of hold magnet HM0(21).

*Perforating line 1—called subscriber's numericals*

When the dialing of the called subscriber's directory number is complete, relay LST(1) in the sender operates. Relay LST(1), upon operating, operates relay STL(1) in an obvious circuit. Relay STL(1), upon operating, completes, under the control of various connector relays as will be seen, a circuit for stepping the minor switch 1100 one step. Such circuit extends from ground over the contact of relay STL(1), conductor 120, contacts 1 of relays AUXSA (2) and AUXDMA(2), conductor 215, contact 3 of relay RC(11), contact 1 of the right-hand contact bank of minor switch 1100, wiper arm 1101, to battery through the winding of stepping magnet STP(11). Magnet STP(11), upon operating, steps wiper arm 1101 to its contact 2, and steps wiper arm 1102 to its contact 1.

The various positions of wiper arm 1102 correspond to the following functions:

| Position | Associate Function |
| --- | --- |
| 0 | Normal—no function. |
| 1 | Perforate called subscriber's numericals. |
| 2 | Perforate called subscriber's office code. |
| 3 | Perforate calling subscriber's number. |
| 4 | Perforate district junctor number. |
| 5 | Release minor switch 1100. |

With wiper arm 1102 in position 1, the called subscriber's directory numericals and station digit, if any, are perforated on the tape 2000 (see Fig. 20) on a two-out-of-five basis. A circuit is completed from ground, over contact 4 of relay SC0(3), conductor 310, wiper arm 1102, contact 1 of the left bank of switch 1100, to battery through the winding of the numerical connector relay NUM(11), which relay thereupon operates. The stations digit 5 is transferred from grounds, over contacts 22 and 24 of relay NUM(11), conductors 1103, cable 1108, conductors 1103, contacts 22 and 24 of the cross-bar switch, verticals 2104, conductors 1801, cable 1800, conductors 1801, windings of punch magnets 25(20) and 27(20) to battery. Magnets 25(20) and 27(20) operate to punch the digit 5 in tape 2000 on a two-out-of-five basis in the group of five magnets 24(20) to 28(20). At the same time the units digit 3 is transferred from grounds, over contacts 17 and 18 of relay NUM(11), conductors 1104, cable 1108, conductors 1104, contacts 17 and 18 of the cross-bar switch, verticals 2105, conductors 1802, cable 1800, conductors 1802, windings of punch magnets 20(20) and 21(20) to battery. Magnets 20(20) and 21(20) operate to punch the digit 3 in tape 2000 on a two-out-of-five basis in the group of five magnets 19(20) to 23(20). In a similar fashion the tens, hundreds and thousands digits 3 are transferred over respective pairs of conductors 1803, 1804 and 1805 (see Fig. 20) to operate respective pairs of punch magnets 15(20) 16(20), 10(20) 11(20) and 5(20) 6(20).

At the same time that the called subscriber's numericals are being transferred to the perforated tape 2000, as above, a special signal is sent from ground, over contact 26 of relay NUM(11), conductor 1109, cable 1108, conductor 1109, contact 28 of the cross-bar switch, vertical 2109, conductor 1806, cable 1800, conductor 1806, to battery through the winding of punch magnet 1(20), to thereby punch a special signal in tape 2000. Another circuit is completed for operating relay RTG(20) extending from ground, over contact 27 of relay NUM(11), conductor 1110, cable 1807, conductor 1110, contact 27 of the cross-bar switch, vertical 2110, conductor 1808, cable 1800, conductor 1808, to battery through the winding of relay RTG(20). Relay RTG(20), upon operating, completes an obvious circuit for operating the perforator tape drum stepping magnet STP(20). The drum 2001 does not step until the release of magnet STP(20).

Relay RTG(20), upon operating, completes another circuit for stepping the minor switch an additional step to initiate the next recording. Such circuit extends from ground, over the right contact of relay RTG(20), conductor 2002, cable 1800, conductor 2002, vertical 1809, contact 29 of the cross-bar switch, conductor 2111, cable 1807, conductor 2111, contact 2 of the right bank of switch 1100, to battery through the winding of magnet STP(11). Magnet STP(11) operates to move its wipers 1101 and 1102 ahead one step.

When wiper arm 1102 leaves its contact 1 relay NUM(11) releases. The release of relay NUM(11) disconnects the leads from the called subscriber's numerical registers of the sender to the perforator, releases all operated punch magnets 1(20) to 28(20), and rleases relay RTG(20). The release of relay RTG(20) releases the tape drum stepping magnet STP(20), thereby permitting the drum to advance one step, or "line," and removes ground from the contacts of the right bank of switch 1100.

*Perforating line 2—called subscriber's office code*

When wiper 1102 makes contact with contact 2 of its bank, the circuit is arranged for perforation in tape 2000 of the called subscriber's office code digits. A circuit is completed from ground on wiper 1102, over contact 2 of its bank, to battery through the winding of the code connector relay CODE(11). Relay CODE(11), upon operating, transfers to the perforator the A, B and C office code digits 352, on a two-out-of-five basis, from ground on contacts of relay CODE(11), over respective pairs of conductors 1105, 1112 and 1111, cable 1108, over contacts of the cross-bar switch, as before, cable 1800, over respective pairs of conductors 1803, 2003 and 2004, to operate respective pairs of punch magnets 15(20) 16(20), 20(20) 22(20) and 24(20) 26(20).

Relay CODE(11), upon operating, similarly to relay NUM(11), operates the special punch magnet 1(20) by grounding conductor 1109 over its contact 16, and operates relay RTG(20) as before from ground over contact 18 of relay CODE(11), contact 28 of relay NUM(11), and over conductor 1110 as before. Relay RTG(20), upon operating, operates step magnet STP(20) and step magnet STP(11) as before. The operation of step magnet STP(11) steps the switch another position where wiper 1102 rests upon contact 3. In the meantime, upon the wiper 1102 leaving its contact 2, relay CODE(11) releases, thereby releasing relay RTG(20) and releasing all operated punch magnets and releasing step magnet STP(20) to advance drum 2001 another step or "line."

*Perforating line 3—calling subscriber's number*

When wiper arm 1102 arrives at its contact 3 a circuit is completed which effects the transfer of the calling subscriber's number to the perforated tap 2000. Ground on wiper 1102 is extended over contact 3 of the left bank of switch 1100, conductor 1113, to battery through the winding of the calling line number connector relay CLN(12).

Upon the operation of relay CLN(12), each of the office, thousands, hundreds, tens and units digits of the calling subscriber is transferred on a two-out-of-five basis to the perforator. For instance, the office digit 3 is transferred by ground on armatures 25 and 24 of relay CLN(12), over the associated contacts, over the pair of conductors 1200, cable 1201, conductors 1200, contacts 2 and 3 of the cross-bar switch, verticals 2108, conductors 1805, cable 1800, conductors 1805, through respective punch magnet windings 5(20) and 6(20), to battery. Magnets 5(20) and 6(20) operate to perforate the office digit 3 in tape 2000 on a two-out-of-five basis in the group of magnets 4(20) to 8(20).

The thousands, hundreds, tens and units digits 0333 are transferred in a like manner, which at this point will be apparent.

Relay CLN(12), upon operating, operates special punch magnet 1(20) as before by extending ground over its contact 1 to conductor 1109. Likewise, relay CLN(12) operates relay RTG(20) by extending ground to conductor 1110 over its contact 27, conductor 1202, contact 19 of relay CODE(11), contact 28 of relay NUM(11), to conductor 1110, which extends, as previously traced, through cable 1807, conductor 1110, contact 27 of the cross-bar switch, vertical 2110, conductor 1808, cable 1800, conductor 1808, to battery through the winding of relay RTG(20).

Relay RTG(20), as before, upon operating, steps the minor switch 1100 another step by operating magnet STP(11) and operates the step magnet STP(20) of the perforator drum.

The advance of the minor switch 1100, as previously described, releases relay CLN(12), thereby releasing all operated punch magnets, relay RTG(20) and step magnet STP(20) to present the fourth "line" to the punch pins for recording the district junctor number.

*Peforating line 4—district junctor number*

With wiper arm 1102 on contact 4 a circuit is completed for effecting the perforating of the junctor number in tape 2000. Relay DIJ(11) operates in a circuit extending from ground on wiper arm 1102, contact 4 of the associated bank, to battery through the winding of relay DIJ(11). Relay DIJ(11), upon operating, operates relay DJ00(23) which is individual to the junctor in use (connected to the sender via the subscriber's sender link—see Fig. 26), there being some one-hundred junctor identification relays DJ00(23) to DJ99(23) per junctor frame. Only that one will be operated according to which junctor is connected with the sender. The circuit for operating relay DJ00(23) extends from ground, over the contact of hold magnet HM0(21), contact 30 of the cross-bar switch, conductor 2112, cable 1807, conductor 2112, contact 1 of relay DIJ(11), contact 41 of relay AUXSA'(11), conductor 1114, over the sender link, to battery through the winding of relay DJ00(23).

Relay DJ00(23), upon operating, applies ground over its contact 5 to conductor 2300, to battery through the winding of punch magnet 3(20), which thereupon punches a hole in tape 2000. Relay DJ00(23) applies ground over its contacts 3 and 4 to the pair of conductors 2301, to battery through the respective windings of punch magnets 22(20) and 23(20), thereby perforating, on a two-out-of-five basis among the group of magnets 19(20) to 23(20), the tens digit zero of the junctor number 00. Relay DJ00(23) also applies ground over its contacts 1 and 2, conductors 2302, to battery through the windings of respective magnets 27(20) and 28(20) to record the units digit zero of the junctor number 00.

In a manner similar to the prior sections of the recording description, relay DIJ(11) operates punch magnet 1(20) by grounding, over its contact 2, conductor 1109, and operates relay RTG(20) by applying ground over contact 3 of relay DIJ(11), conductor 1115, contact 28 of relay CLN(12), conductor 1202, contact 19 of relay CODE(11), contact 28 of relay NOM(11), to conductor 1119, as previously described. Relay RTG(20), upon operating, operates step magnet STP(20) and step magnet STP(11). Step magnet STP(11), upon operating, as before, steps the switch 1100 one more step to place wiper arm 1101 on its contact 6 and wiper arm 1102 on its contact 5. Of course, as previously set forth, when wiper arm 1102 leaves its contact 4, relays DIJ(11), DJ00(23) and RTG(20) release, thereby restoring all punch magnets to normal and releasing step magnet STP(20) to advance drum 2001 an additional step or "line."

Release of minor switch 1100 to normal

With wiper arm 1102 on its contact 5, a circuit is completed for releasing the switch 1100 to normal and for preventing its restepping. Ground on wiper arm 1102 is extended over the associated contact 5 to battery through the winding of the release magnet RLS(11), which thereupon operates to restore the switch 1100 to normal. Relay RC(11) also operates in parallel with magnet RLS(11) and locks to off-normal ground over its contact 2. Relay RC(11), upon operating, opens, at its contact 3, the circuit for step magnet STP(11) thereby preventing switch 1100 from being reoperated.

Release of marker

When the marker has completed its other normal and well-known functions in completing the call, it is released by the sender, thereby releasing all off-normal grounds in the marker to in turn return the marker to normal.

DETAILED DESCRIPTION—OPERATOR CALL

If the calling subscriber dials a called number to which, as determined by his class of service, he is not entitled to have an automatic connection extended, or if the calling subscriber dials an operator code, the present invention provides means for preventing the perforating of any record of the call and substitutes therefor means for connecting the calling line to an operator trunk and for displaying at an operator's position a visual indication of the calling subscriber's directory number. Such an operator, by conversation with the calling party, will determine the desired destination of the call, will record the data pertinent to charging such party including the visually displayed calling party's number, and will manually extend the connection.

All circuit operations may progress as described for a normal, non-operator call, up to the point where, under normal circumstances, the various connector relays NUM(11), CODE(11), CLN(12) and DIJ(11) would be operated in sequence under the control of the minor switch 1100 to perforate the above-described "initial entry" in tape 2000.

It will be assumed, as a result of translation of the calling subscriber's location information such as translator line group, column number, switch number and vertical file number, that the class-of-service relay SO(9) is operated as before. However, in order to illustrate the operator call aspects of the present invention it will be assumed that the marker, as a result of decoding the called office code digits, ground punching 901 (see Fig. 9) instead of punching 900 as before.

Prevention of perforator action

The grounding by the marker of code point 901, with class-of-service relay SO(9) operated, operates route relay RI(9) in a circuit extending from ground on code point 901, over contact 4 of relay SO(9), to battery through the winding of route relay RI(9). Relay RI(9) operates and provides to the marker over its contacts 3 to N, as is well known, routing instructions for this call. The marker, in accordance with such instructions, will extend the connection to an operator's trunk appearing in a jack (such as 1600 of Fig. 16) at an operator's switchboard.

Relay RI(9), upon operating, applies ground over its contact 1, conductor 902, to battery through the winding of release relay RLS(11) and, in parallel therewith, to battery over contact 1 of relay RC(11) and through the winding of relay RC(11). Relays RLS(11) and RC(11) operate as before to prevent the operation of minor switch 1100, thereby preventing or eliminating any recording on tape 2000 of any information pertaining to the call.

Seizing and connecting to trunk register

Upon the operation of route relay RI(9), a circuit is completed from ground, over contact 2 of relay RI(9), conductor 903, contact 29 of connector relay CLN(12), to battery through the winding of the operator connector relay OPD(12), and in parallel therewith over conductor 1203, contact 1 of relay SLR(13), through a preference and lock-out circuit to battery through the preference relay P(13).

Relay OPD(12), upon operating, extends the grounds on the two-out-of-five pairs of conductors from the directory number and class-of-service relays of Fig. 8 to a horizontal unit of the cross-bar switch arrangement illustrated in Fig. 13. The office digit 3, represented by grounded conductors 810 and 811 in Fig. 12, is extended over contacts 24 and 23 of relay OPD(12), conductors 1204, cable 1209, conductors 1204, to contacts 29 and 28 of the cross-bar switch. The thousands digit zero, on conductors 808 and 809, is extended over contacts 17 and 16 of relay OPD(12), conductors 1205, cable 1209, conductors 1205, to contacts 22 and 21 of the cross-bar switch. The hundreds digit 3 on conductors 806 and 807, is extended over contacts 14 and 13 of relay OPD(12), conductors 1206, cable 1209, conductors 1206, to contacts 19 and 18 of the cross-bar switch. The tens and units digits 3, on respective pairs of conductors 804—805 and 802—803, are extended over respective pairs of contacts 9—8 and 4—3 of relay OPD(12), conductors 1207 and 1208, cable 1209, conductors 1207 and 1208, to respective pairs of contacts 14—13 and 9—8 of the cross-bar switch.

Relay P(13), upon operating, operates select magnet SEL(13) (corresponding to the marker in use) in a circuit from ground, over the contact of relay P(13), contact 2 of relay SLR(13) to battery through the winding of select magnet SEL(13). Select magnet SEL(13) operates to condition its horizontal unit of contacts such that upon the operation of a hold magnet (corresponding to the trunk selected by the marker to extend the call to an operator) the proper cross-points will be closed to complete an interconnection between the registers of the marker (Fig. 8) and corresponding registers in the trunk (Fig. 14).

When the hold magnet (not shown) associated with the operator trunk is operated by the marker in completing the connection to such operator, the hold magnet HOLD(13) is operated in parallel therewith over conductor 1300 to complete the above interconnection between the two sets of registers. Upon the operation of hold magnet HOLD(13), a circuit is completed for operating the select magnet release relay SLR(13) extending from ground, over the contact of hold magnet HOLD(13), contact 1 of the cross-bar switch, to battery through the winding of relay SLR(13). Relay SLR(13), upon operating, releases relay P(13) and select magnet SEL(13), leaving the cross-bar connection under the control of hold magnet HOLD(13).

*Operating trunk registers*

Without going into unnecessary detail, it will be apparent that upon the closure of the crosspoints on the cross-bar switch of Fig. 13, the five calling line directory number digits are transferred to the five registers of Fig. 14. For example, the units digit 3 is transferred by extending the grounds on contacts 9 and 8 of the cross-bar switch, over conductors 1311, cable 1305, cable 1306, cable 1305, conductors 1311, to batteries through the windings of relays 1(14) and 2(14) of the units register. Relays 1(14) and 2(14) lock over their contacts 1, conductor 1400, contact 1 of the cross-bar switch of Fig. 13, to ground over the contact of hold magnet HOLD(13). Relays 1(14) and 2(14), upon operating, extend, on a two-out-of-five basis, the grounds over their contacts 2, conductors 1401, cable 1406, cable 1411, cable 1406, conductors 1401, to verticals of the cross-bar switch of Fig. 15 associated with contacts 7 and 8 thereof.

The verticals, and thus the hold magnets, of the cross-bar switch of Fig. 15 are associated with the operator trunk and the horizontal units of the switch, and thus the select magnets thereof, are associated with operators' position circuits.

In a similar manner the tens, hundreds, thousands and office digits are transferred to the pertinent registers of Fig. 14 over respective pairs of conductors 1310, 1309, 1308 and 1307 and such registrations are extended by the relays of Fig. 14 over respective conductors 1402, 1403, 1404 and 1405 to verticals of the cross-bar switch of Fig. 15 associated with respective contacts 12—13, 17—18, 24—25 and 27—28 thereof.

*Connection to position circuit and register*

When the operator trunk is cut through to the operator's switchboard position, lamp L(16) at the operator's position lights. An operator answers the call by inserting the answering cord of her cord circuit 1601 into jack 1600 associated with the calling trunk. Relay SL(16) operates in a circuit extending from ground, through its left-hand high resistance winding, over the sleeves of the plug and jack 1600, to battery through the winding of marginal relay MTS(16). Relay MTS(16) will not operate in series with the high resistance winding of relay SL(16); however, relay SL(16) operates at this time.

Relay SL(16) upon operating, completes a circuit for operating the preference relay P(15), extending from ground, over contact 1 of relay SL(16), conductor 1602, contact 1 of relay SLR(15), winding of relay P(15), through a preference lock-out circuit (shown as a dotted line), to battery. Relay P(15), upon operating, operates relay LR(15) and select magnet SEL(15) in a circuit extending from ground, over the contact of relay P(15), contact 2 of relay SLR(15), winding of the low resistance relay LR(15) to battery through the winding of select magnet SEL(15). Relay LR(15), upon operating, extends ground over its contact and conductor 1500 to battery through the left operating winding of relay ASL(16). Relay ASL(16) operates and locks by means of its right holding winding under control of relay SL(16), the latter holding winding of relay ASL(16) having been incapable of operating relay ASL(16) at the time that relay SL(16) operated.

Upon the operation of relay ASL(16), ground is extended over the contact of relay CS(16), contact of relay ASL(16), through the right low resistance winding of relay SL(16), over the sleeves of the plug and jack 1600 to battery through the winding of marginal relay MTS(16). Relay MTS(16) operates in series with the low resistance winding of relay SL(16) and applies ground over its contact, conductor 1603, to battery through the winding of hold magnet HOLD(15). Hold magnet HOLD(15) operates to close the cross-points on the cross-bar switch of Fig. 15. Upon the operation of hold magnet HOLD(15), the select magnet release relay SLR(15) is operated in a circuit extending from ground, over the contact of hold magnet HOLD(15), contact 1 of the cross-bar switch, to battery through the winding of relay SLR(15). Relay SLR(15), upon operating, releases relays P(15) and LR(15) and select magnet SEL(15).

*Displaying calling number at operator's position*

Upon the closure of the cross-points of the cross-bar switch in Fig. 15, the five sets of two-out-of-five grounded verticals of the switch are extended on a two-out-of-five basis to register relays of Fig. 16, where the two-out-of-five registrations are translated into one-out-of-ten indications for lighting the display lamps of Fig. 17. For example, the office digit 3, represented by grounded conductors 1405, is extended over contacts 28 and 27 of the cross-bar switch, conductors 1501, cable 1506, conductors 1501, to batteries through the windings of relays 1(16) and 2(16) of the office register. Relays 1(16) and 2(16) operate and lock over their contacts 1, conductor 1604, contact 1 of the cross-bar switch of Fig. 15, to ground over the contact of hold magnet HOLD(15). The operation of relays 1(16) and 2(16) of the office register at the operator's position causes ground to be applied over contact 2 of relay 1(16), contact 4 of relay 2(16), to conductor 1605, which when grounded lights lamp 3(17) of the ten office display lamps. The other digits such as thousands, hundreds, tens and units, represented respectively by the pairs of grounded conductors 1404, 1403, 1402 and 1401, are extended by grounds over respective pairs of contacts 25—24, 18—17, 13—12 and 8—7 of the cross-bar switch in Fig. 15, conductors 1502, 1503, 1504 and 1505, cable 1506, conductors 1502, 1503, 1504 and 1505, to operate, on a two-out-of-five basis, two relays each in the respective registers of Fig. 16. These register relays operate, lock to ground on conductor 1604, and translate the registrations to a one-out-of-ten grounded conductor basis, such as conductors 1606, 1608, 1610 and 1612. The grounded conductors 1606, 1608, 1610 and 1612 are extended through respective cables 1607, 1609, 1611 and 1613 to operate the lamp 0(17) of the thousands display, lamp 3(17) of the hundreds display, lamp 3(17) of the tens display, and lamp 3(17) of the units display.

By means of the display lamps of Fig. 17, the operator who answered the calling trunk can, without making any electrical tests or verbal inquiries, determine the identity of the calling subscriber for billing purposes.

*Completing the operator connection*

Having obtained the desired destination of the call from the calling subscriber and having made a memorandum of the calling subscriber's number as shown on the display lamp, the operator will complete the desired connection by inserting the completing end of her cord circuit 1601 into a jack 1614 which may represent a trunk or other suitable circuit desired by the calling subscriber.

Upon completing a connection to jack 1614, the operator effects the operation of relays CS(16) and TS(16) in an obvious circuit over the sleeves of the plug and jack 1614. Relay CS(16), upon operating, releases relay MTS(16). The release of relay MTS(16) releases hold magnet HOLD-(15) thereby returning the cross-bar switch of Fig. 15 to normal and releasing relay SLR(15).

The return to normal of the cross-bar switch of Fig. 15 releases the register relays of Fig. 16 thereby extinguishing any lighted display lamps of Fig. 17.

The rest of the operated equipment of the trunk will release with the trunk and that of the marker will release when the marker releases. When the marker releases, if the trunk is still busy, the cross-bar switch of Fig. 13 will remain operated along with the register relays of Fig. 14 until the trunk releases.

It is to be understood that the above-described arrangements are illustrative of the application of the principles of the invention. Numerous other arrangements may be devised by those skilled in the art without departing from the spirit and scope of the present invention.

What is claimed is:

1. In a telephone system, calling lines, trunks to called destinations, switches having access to said lines and to said trunks, common control means responsive to a calling condition on any one of said lines for controlling said switches according to the called destination desired by said calling line, registering means in said control means for registering the directory number and class of service of said calling line and for registering the called destination, recording means operable by said control means for recording said directory number on certain calls, visual display means operable by said control means for displaying said directory number on other calls, circuit means in said control means for comparing said class of service and said called destination, and switching means controlled by said circuit means to operate only one of either of said recording means or said visual display means depending upon the result of said comparison.

2. In a telephone system, calling lines, trunks to operators and to other destinations, switches having access to said lines and to said trunks, common control means responsive to a calling condition on one of said lines for controlling said switches according to the called destination desired by said calling line, registering means in said control means for registering the directory number and class of service of said calling line and for registering the called destination, recording means operable by said control means for recording said directory number on certain calls extended to trunks other than operator trunks, visual display means operable by said control means for displaying said directory number on other calls extended to operator trunks, circuit means in such control means for comparing said class of service and said called destination, and switching means controlled by said circuit means to operate only one of either of said recording means or said visual display means depending upon the result of said comparison.

3. In a telephone system, calling lines, trunks to operators and to other destinations, switches having access to said lines and to said trunks, common control means responsive to a calling condition on one of said lines for controlling said switches according to the called destination desired by said calling line, registering means in said control means for registering the directory number and class of service of said calling line and for registering the called destination, recording means operable by said control means for recording said directory number on certain calls extended to trunks other than operator trunks, visual display means operable by said control means for displaying said directory number on other calls extended to operator trunks, circuit means in such control means for comparing said class of service and said called destination, and switching means controlled by said circuit means to operate only said recording means when said comparison shows that said class of service entitles said calling subscriber to a connection over a trunk other than an operator trunk.

4. In a telephone system, calling lines, trunks to operators and to other destinations, switches having access to said lines and to said trunks, common control means responsive to a calling condition on one of said lines for controlling said switches according to the called destination desired by said calling line, registering means in said control means for registering the directory number and class of service of said calling line and for registering the called destination, recording means operable by said control means for recording said directory number on certain calls extended to trunks other than operator trunks, visual display means operable by said control means for displaying said directory number on other calls extended to operator trunks, circuit means in such control means for comparing said class of service and said called destination, and switching means controlled by said circuit means to operate only said display means when said comparison shows that said class of service limits said calling subscriber to a connection over an operator trunk.

5. In a telephone system, line switches, subscribers' lines, terminations of said lines in said line switches, said lines identifiable according to the physical location of said terminations in said line switches, trunks to operators and to other destinations, other switches having access to said trunks and to said lines, common control means responsive to a calling condition on one of said lines for interconnecting with said calling line by means of said line switches, registering means in said control means responsive to said interconnection for registering the line switch location of said calling line and for registering the called destination desired by said calling line, means under the control of said control means for translating said switch location to the directory number and class of service of said calling line, recording means operable by said control means to record on a record medium items of information concerning a call extended to a trunk other than an operator trunk, a visual display in view of an operator and operable by said control means to display visually the directory number of a calling line concerning a call extended to an operator trunk, circuit means within said control means for comparing the class of service of said calling subscriber with the called destination, and switching means controlled by said circuit means to operate only one of either of said recording means or said visual display depending upon the comparison made thereby of said class of service and of said calling destination.

6. In a telephone system, line switches, subscribers' lines, terminations of said lines in said line switches, said lines identifiable according to the physical location of said terminations in said line switches, trunks to operators and to other destinations, other switches having access to said trunks and to said lines, common control means responsive to a calling condition on one of said lines for interconnecting with said calling line by means of said line switches, registering means in said control means responsive to said interconnection for registering the line switch location of said calling line and for registering the called destination desired by said calling line, means under the control of said control means for translating said switch location to the directory number and class of service of said calling line, recording means operable by said control means to record on a record medium items of information concerning a call extended to a trunk other than an operator trunk, a visual display in view of an operator and operable by said control means to display visually the directory number of a calling line concerning a call extended to an operator trunk, circuit means within said control means for comparing the class of service of said calling subscriber with the called destination, and switching means controlled by said circuit means to operate only said recording means when said comparison shows that said class of service entitles said calling subscriber to a connection over a trunk other than an operator trunk.

7. In a telephone system, line switches, subscribers' lines, terminations of said lines in said line switches, said lines identifiable according to the physical location of said terminations in said line switches, trunks to operators and to other destinations, other switches having access to said trunks and to said lines, common control means responsive to a calling condition on one of said lines for interconnecting with said calling line by means of said line switches, registering means in said control means responsive to said interconnection for registering the line switch location of said calling line and for registering the called destination desired by said calling line, means under the control of said control means for translating said switch location to the directory number and class of service of said calling line, recording means operable by said control means to record on a record medium items of information concerning a call extended to a trunk other than an operator trunk, a visual display in view of an operator and operable by said control means to display visually the directory number of a calling line concerning a call extended to an operator trunk, circuit means within said control means for comparing the class of service of said calling subscriber with the called destination, and switching means controlled by said circuit means to operate only said visual display when said comparison shows that said class of service limits said calling subscriber to a connection over an operator trunk.

FREDERICK J. SCUDDER.
EDWARD VROOM.

REFERENCES CITED

The following references are of record in the file of this patent:

UNITED STATES PATENTS

| Number | Name | Date |
|---|---|---|
| 1,592,646 | Ray | July 13, 1926 |
| 1,834,649 | Saunders | Dec. 1, 1931 |
| 2,299,212 | Collis | Oct. 20, 1942 |
| 2,319,424 | Maloney | May 18, 1943 |
| 2,484,612 | Dehn | Oct. 11, 1949 |